(12) United States Patent
Murray et al.

(10) Patent No.: US 12,554,692 B2
(45) Date of Patent: Feb. 17, 2026

(54) SYSTEMS AND METHODS FOR A SCALABLE VERSIONED DATABASE

(71) Applicant: Kinaxis Inc., Ottawa (CA)

(72) Inventors: Christopher Murray, Ottawa (CA); Franck Bohoua-Nasse, Montreal (CA); James R. Crozman, Ottawa (CA); Angela Lin, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 18/815,145

(22) Filed: Aug. 26, 2024

(65) Prior Publication Data

US 2025/0068608 A1 Feb. 27, 2025

Related U.S. Application Data

(60) Provisional application No. 63/578,428, filed on Aug. 24, 2023.

(51) Int. Cl.
*G06F 16/00* (2019.01)
*G06F 16/21* (2019.01)
*G06F 16/23* (2019.01)
*G06F 12/02* (2006.01)

(52) U.S. Cl.
CPC ........ *G06F 16/219* (2019.01); *G06F 16/2365* (2019.01); *G06F 16/2379* (2019.01); *G06F 12/0253* (2013.01)

(58) Field of Classification Search
CPC ............... G06F 16/219; G06F 16/2365; G06F 16/2379; G06F 12/0253
See application file for complete search history.

(56) References Cited

U.S. PATENT DOCUMENTS

| | | | |
|---|---|---|---|
| 7,904,434 B2 | 3/2011 | Yalamanchi et al. | |
| 9,576,038 B1 | 2/2017 | Huang et al. | |
| 9,922,086 B1 | 3/2018 | Huang et al. | |
| 10,482,103 B2 * | 11/2019 | Lee | G06F 16/2228 |
| 10,585,876 B2 * | 3/2020 | Brodt | G06F 16/2365 |
| 10,802,927 B2 * | 10/2020 | Li | G06F 11/1458 |
| 11,023,457 B1 * | 6/2021 | Maretic | G06F 16/2329 |
| 11,321,299 B2 | 5/2022 | Bortnikov et al. | |

* cited by examiner

*Primary Examiner* — Cheryl Lewis

(74) *Attorney, Agent, or Firm* — Ruggiero McAllister & McMahon LLC

(57) ABSTRACT

Systems and methods that for a scalable versioned database that can organize data into scenarios and hives. These define how data visibility is controlled by scenarios, and how data can be transferred between scenarios. In some embodiments, queries and algorithms can be executed in independent processes, which may execute in parallel, and on independent machines. Furthermore, data objects can be placed in shared storage, and metadata objects can be placed in a metadata database which supports ACID transactions. Data objects are not modified in place after they are constructed, while metadata objects can be updated transactionally, using the metadata database. Data can be updated by creating new data objects and connecting them to scenarios with new metadata objects. Finally, obsolete data may be cleaned up by identifying unreachable data, which is safe to delete.

12 Claims, 22 Drawing Sheets

SYSTEMS AND METHODS FOR A SCALABLE VERSIONED DATABASE

The present application claims the benefit of U.S. Ser. No. 63/578,428 filed Aug. 24, 2023, which is entirely incorporated herein by reference.

BACKGROUND

There is a need to find a technical solution that allows a user (or process) to perform isolated speculative data changes, run algorithms/simulations, and read results-all within a system that supports a plethora of users and a plethora of isolated data sandboxes in a cost-efficient manner. There is also need to ensure the integrity of that data in such a system. There is also a need to allow algorithm developers to provide various algorithm implementations to run against the data contained in the isolated data sandboxes.

BRIEF SUMMARY

Disclosed herein are systems and methods for a scalable versioned database that can organize data into scenarios and hives. The systems and methods define how data visibility is controlled by scenarios, and how data can be transferred between scenarios. In some embodiments, queries and algorithms can be executed in independent processes, which may execute in parallel, and on independent machines. Furthermore, data objects can be placed in shared storage, and metadata objects can be placed in a metadata database (which supports transactions that are atomic, consistent, isolated and durable—or ACID). Data objects are not modified in place after they are constructed, while metadata objects can be updated transactionally, using the metadata database. Data can be updated by creating new data objects and connecting them to scenarios with new metadata objects. Finally, obsolete data may be cleaned up by identifying unreachable data (also termed as "garbage"), which is safe to delete.

In one aspect, a computing apparatus is provided, that includes a processor. The computing apparatus also includes a memory storing instructions that, when executed by the processor, configure the apparatus to: open, by the processor, a transaction in a metadata key-value database; obtain, by the processor, a scenario definition of the scenario from the a metadata key-value database; obtain, by the processor, a current snapshot ID from the scenario definition; add, by the processor, a view in the metadata key-value database, the view referencing the current snapshot ID; commit, by the processor, the transaction in the metadata key-value database; execute, by the processor, a read query; open, by the processor, the transaction in the metadata key-value database; remove, by the processor, the view in the metadata key-value database; and commit, by the processor, the transaction in the metadata key-value database.

When executing the read query, the apparatus may be further configured to access snapshot data.

When accessing the snapshot data, the apparatus may be further configured to: obtain, by the processor, a schema ID from a snapshot corresponding to the current snapshot ID; obtain, by the processor, a schema corresponding to the schema ID from a schema storage object; obtain, by the processor, a location of a column instance ID in the snapshot; obtain, by the processor, the column instance ID using the location; and obtain, by the processor, a column instance from a data object storage, using the column instance ID.

The computing apparatus may also include where the transaction is committed in the metadata key-value database provided the scenario definition remained unchanged outside the transaction since the transaction opened. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: open, by the processor, a transaction in a metadata key-value database; obtain, by the processor, a scenario definition of the scenario from the a metadata key-value database; obtain, by the processor, a current snapshot ID from the scenario definition; add, by the processor, a view in the metadata key-value database, the view referencing the current snapshot ID; commit, by the processor, the transaction in the metadata key-value database; execute, by the processor, a read query; open, by the processor, the transaction in the metadata key-value database; remove, by the processor, the view in the metadata key-value database; and commit, by the processor, the transaction in the metadata key-value database.

When executing the read query, the computer-readable storage medium may also include instructions that configure the computer to access snapshot data.

When accessing the snapshot data, the computer may be further configured to: obtain, by the processor, a schema ID from a snapshot corresponding to the current snapshot ID; obtain, by the processor, a schema corresponding to the schema ID from a schema storage object; obtain, by the processor, a location of a column instance ID in the snapshot; obtain, by the processor, the column instance ID using the location; and obtain, by the processor, a column instance from a data object storage, using the column instance ID.

The computer-readable storage medium may also include where the transaction is committed in the metadata key-value database provided the scenario definition remained unchanged outside the transaction since the transaction opened. Other technical features may be readily apparent to one skilled in the art from the following figures, descriptions, and claims.

In one aspect, a computer-implemented method for executing a read query in a scenario in a scalable versioned database is provided, the method includes: opening, by a processor, a transaction in a metadata key-value database; obtaining, by the processor, a scenario definition of the scenario from the a metadata key-value database; obtaining, by the processor, a current snapshot ID from the scenario definition; adding, by the processor, a view in the metadata key-value database, the view referencing the current snapshot ID; committing, by the processor, the transaction in the metadata key-value database; executing, by the processor, the read query; opening, by the processor, the transaction in the metadata key-value database; removing, by the processor, the view in the metadata key-value database; and committing, by the processor, the transaction in the metadata key-value database.

When executing the read query, the method may also include accessing snapshot data. When accessing the snapshot data, the method may further include: obtaining, by the processor, a schema ID from a snapshot corresponding to the current snapshot ID; obtaining, by the processor, a schema corresponding to the schema ID from a schema storage object; obtaining, by the processor, a location of a column instance ID in the snapshot; obtaining, by the processor, the column instance ID using the location; and obtaining, by the processor, a column instance from a data object storage, using the column instance ID.

The computer-implemented method may also include where the transaction is committed in the metadata key-value database provided the scenario definition remained unchanged outside the transaction since the transaction opened. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter may become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
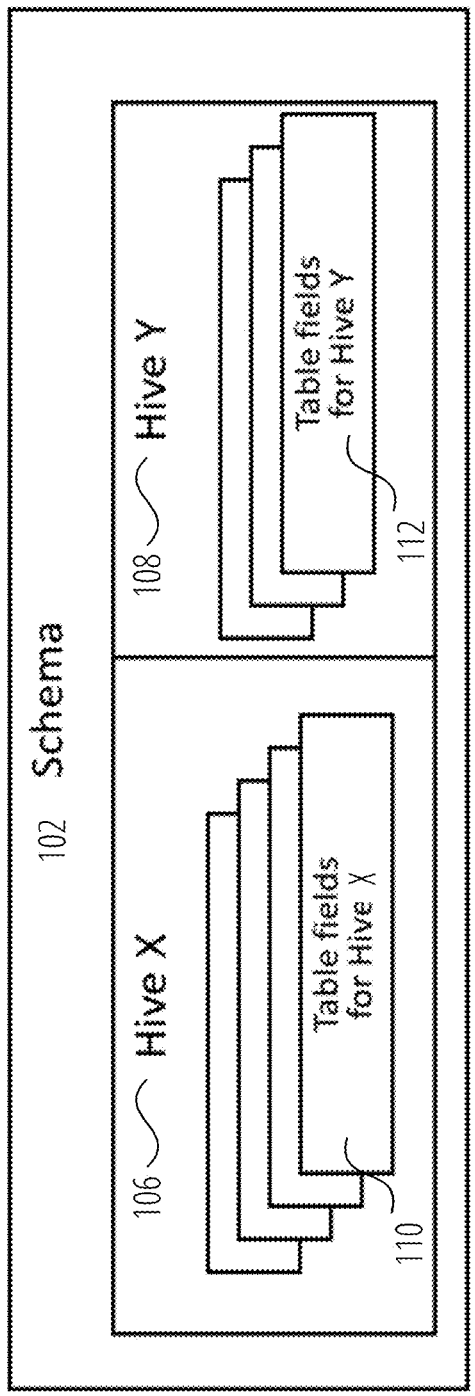
FIG. 1A illustrates partitioning of a schema into hives, in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

Definitions

A few definitions of terms are provided below.

Database: a collection of tabular data.

Schema: specifies the tables, columns, and column properties in the database. A column's properties includes the hive of the column.

Hive: a partition of a database schema. A hive defines the scope of a database transaction. Each table column belongs to a hive. A table may contain columns that belong to different hives. As a consequence, the database data can also be partitioned into hives. Furthermore, scenarios, views, and snapshots can be scoped to a hive.

Data category (Input or Calculated): the database contains both input and calculated data. Calculated data is data that is computed by algorithms that execute in the database. Non-calculated data is called "input data". Calculated data is often (but not necessarily) derived from input data. A database table may be completely calculated. Or a database table may contain some input columns and some calculated columns. This is specified by the schema. Note that calculated data can be accessed in tabular format.

Garbage: unreachable data in the database, which is safe to delete. Garbage can be left behind by a process for updating data.

Scenarios: a scenario is a sandbox for isolating data from other concurrent database users, and controlling the flow of data to other database users. As such, database data may be viewed through one or more scenarios. Each database query or algorithm executes in the context of a scenario. In each hive, scenarios are related to each other in a tree. Each scenario may have one parent scenario. A scenario with no parent is called a "root" scenario. A parent scenario may have one or more child scenarios. There can be no relationship between scenarios in different hives.

FIG. 1A illustrates partitioning of a schema into hives, in accordance with one embodiment. in accordance with one embodiment. In the embodiment shown in FIG. 1A, two hives are shown: Hive X (106) and Hive Y (108). A hive is a partition of a database schema 102. A hive defines the scope of a database transaction. Each table column belongs to a hive. A table may contain columns that belong to different hives. In schema 102, there are table fields for Hive X (110), and table fields for Hive Y (112).

Figure 1B:
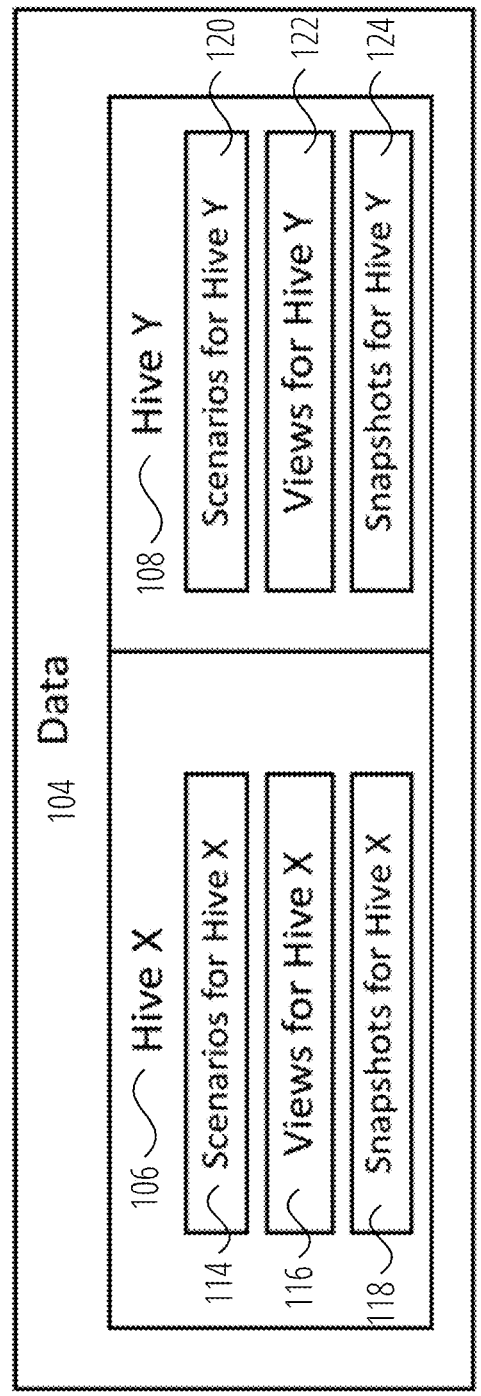
FIG. 1B illustrates partitioning of data into hives, in accordance with one embodiment.

FIG. 1B illustrates partitioning of data into hives, in accordance with one embodiment. As a consequence of partitioning table columns into hives, the database data 104 can also be partitioned into hives. Scenarios, views, and snapshots can be scoped to a hive. In database data 104, there are scenarios 114, views 116 and snapshots 118, respectively for Hive X 106. Similarly, there are scenarios 120, views 122 and snapshots 124, respectively for Hive Y 108.

In each hive, scenarios are related to each other in a tree. Each scenario may have one parent scenario. A scenario with no parent is called a "root" scenario. A parent scenario may have one or more child scenarios. Furthermore, there can be no relationship between scenarios in different hives.

Figure 2:
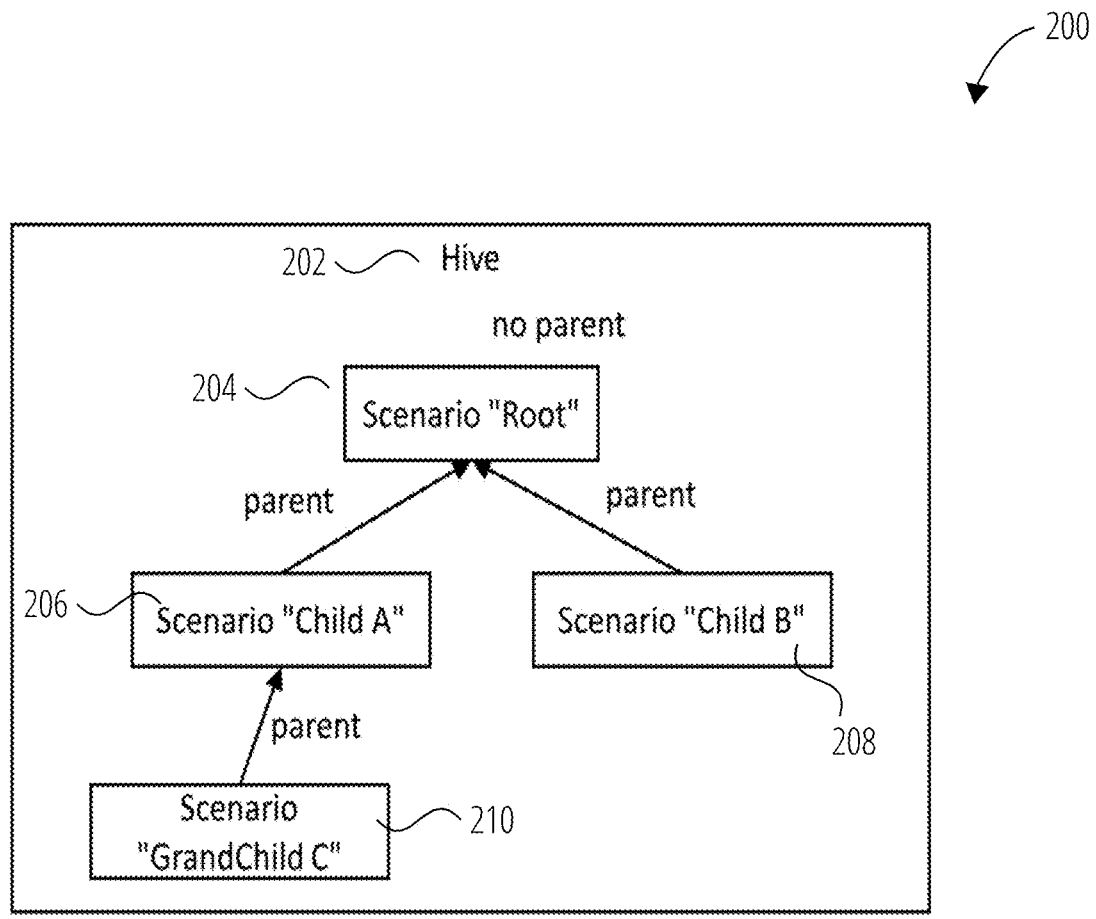
FIG. 2 illustrates a scenario tree in accordance with one embodiment.

FIG. 2 illustrates a scenario tree 200 in accordance with one embodiment. Scenario tree 200 is within hive 202. Root scenario 204 has no parent; however it has child "A" scenario 206 and child "B" scenario 208. Thus, root scenario 204 is a parent of child "A" scenario 206, and is also a parent of child "B" scenario 208. Grandchild "C" scenario 210 is a grandchild of root scenario 204, and is a child of child "A" scenario 206. That is, child "A" scenario 206 is a parent of grandchild "C" scenario 210.

Scenario Control of Data Visibility

When a scenario is created, it initially inherits all the data of its parent scenario. If the scenario is a root scenario, then it initially has no data (that is, all tables in the scenario's hive are empty.) Data changes in a scenario override its parent's data. Data changes in a scenario are visible only in the scenario, until they are explicitly transferred (see below). An example of "Scenario Data Visibility" is shown below.

Transfer of Data from One Scenario to Another

Data can be transferred between scenarios using git-like push and pull operations. Here are two defined operations:

ScenarioUpdate is an operation to pull and merge a parent's data changes into a child scenario.

ScenarioCommit is an operation to push a child scenario's data changes into its parent. These operations only work on scenarios that are in a parent-child relationship. Data can be copied from one scenario to an unrelated scenario using queries. An example of "Scenario Data Visibility" is shown below.

Scenario Data Visibility Example

An example database has one hive, and one table called Parts, which has the following columns: PartID, Quantity, Date. Steps 1-3 refer to creation of a scenario tree (see FIG. 2 for an example of a scenario tree).

Step 1: Initially, there is only a "Root" scenario, and the Parts table has this form in the scenario:

| Root | | |
|---|---|---|
| PartID | Quantity | Date |
| Wheel | 50 | Jan. 16, 2022 |

Step 2: Scenarios "Child A", "Child B" and "GrandChild C" are created, as shown in FIG. 2. All three scenarios have the same content in Parts as "Root". The Parts table of each is as follows:

| Child A | | |
|---|---|---|
| PartID | Quantity | Date |
| Wheel | 50 | Jan. 16, 2022 |

| Child B | | |
|---|---|---|
| PartID | Quantity | Date |
| Wheel | 50 | Jan. 16, 2022 |

| GrandChild C | | |
|---|---|---|
| PartID | Quantity | Date |
| Wheel | 50 | Jan. 16, 2022 |

Step 3: Insert a new row in "Child A" that includes 50 rims on Jan. 20, 2022. The content of Parts in "Root", "Child B" and "GrandChild C" remain unchanged, but the content of Parts in "Child A" is now:

| Child A | | |
|---|---|---|
| PartID | Quantity | Date |
| Wheel | 50 | Jan. 16, 2022 |
| Rim | 50 | Jan. 20, 2022 |

Step 4: Perform ScenarioUpdate (GrandChild C) to pull changes down from its parent ("Child A") into this scenario. The content of Parts in "Root" and "Child B" remain the same as in step 1. However, the content of Parts in "GrandChild C" is updated to match the content of "Child A" in step 3. Parts in "Child C" is now:

| GrandChild C | | |
|---|---|---|
| PartID | Quantity | Date |
| Wheel | 50 | Jan. 16, 2022 |
| Rim | 50 | Jan. 20, 2022 |

Step 5: Perform ScenarioCommit (Child A) to push its changes up the tree to its parent, which is "Root". The content of "Child B" remains the same as in step 1. However, the content of "Root" is updated to the content in step 3. Parts in "Root" is now:

| Root | | |
|---|---|---|
| PartID | Quantity | Date |
| Wheel | 50 | Jan. 16, 2022 |
| Rim | 50 | Jan. 20, 2022 |

Step 6: Insert a new row in "Child B" that includes 500 spokes on Feb. 1, 2022. The content of "Root", "Child A", "GrandChild C" remain unchanged from steps 3-5. However, the content of "Child B" is now:

| Child B | | |
|---|---|---|
| PartID | Quantity | Date |
| Wheel | 50 | Jan. 16, 2022 |
| Spoke | 500 | Feb. 1, 2022 |

Step 7: Perform ScenarioUpdate (Child B) to pull changes from its parent ("Root") down into it. The inserted rows are merged. Now the content of "Root", "Child A", "GrandChild C" remain unchanged as in steps 3-5. However, the content of "Child B" is now:

| Child B | | |
|---|---|---|
| PartID | Quantity | Date |
| Wheel | 50 | Jan. 16, 2022 |
| Rim | 50 | Jan. 20, 2022 |
| Spoke | 500 | Feb. 1, 2022 |

Step 8: Perform ScenarioCommit (Child B) to push its changes up the tree to its parent ("Root"). Now "Root" content is updated to the content in step 7. "Child A" and "GrandChild C" remain as in step 3 and step 4, respectively. The content of "Root" is now:

| Root | | |
|---|---|---|
| PartID | Quantity | Date |
| Wheel | 50 | Jan. 16, 2022 |
| Rim | 50 | Jan. 20, 2022 |
| Spoke | 500 | Feb. 1, 2022 |

Figure 3:
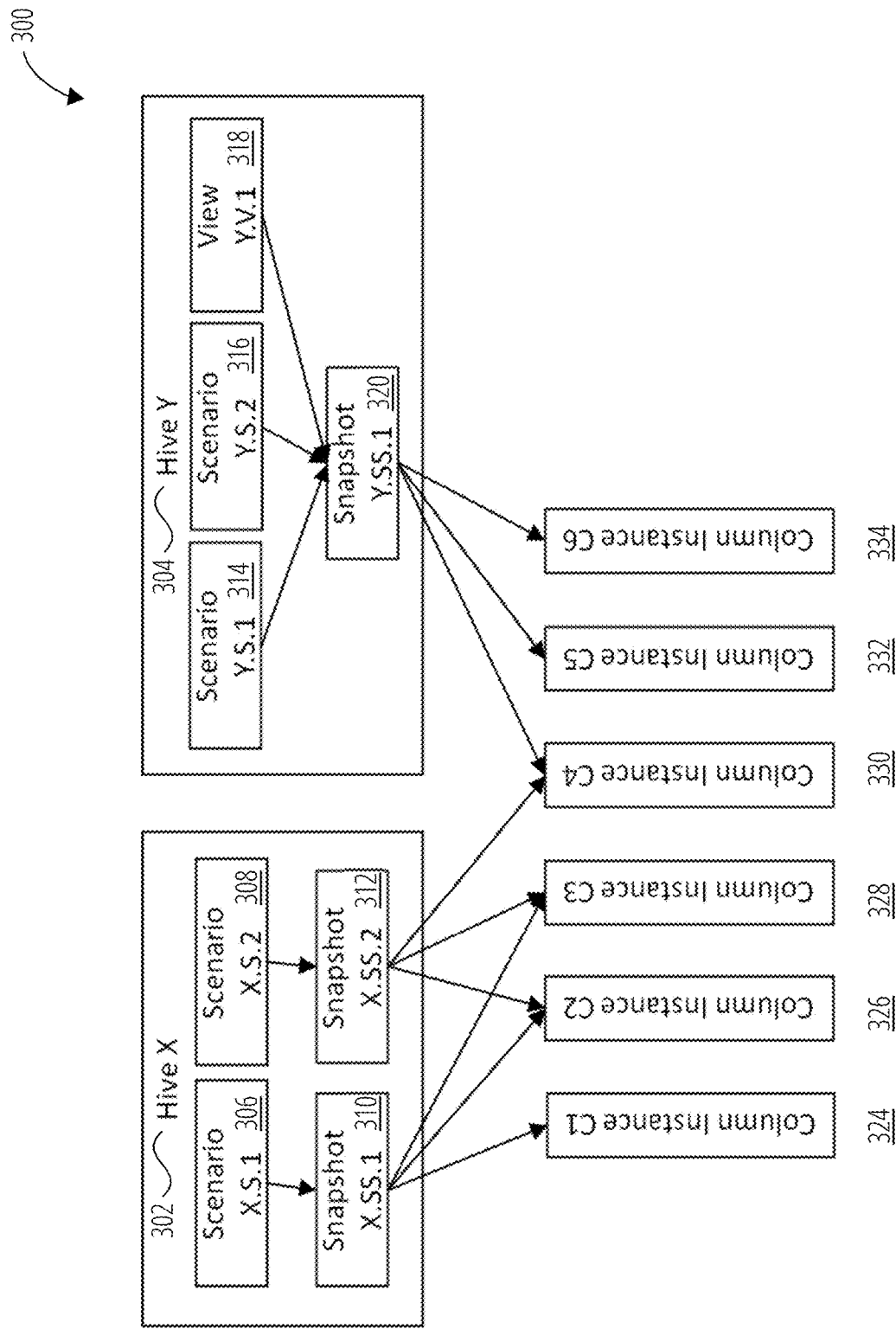
FIG. 3 illustrates scenario data in accordance with one embodiment.

FIG. 3 illustrates scenario data 300 in accordance with one embodiment. FIG. 3 provides an illustration of how the data can be represented in a scenario. In the embodiment shown in FIG. 3, two hives are presented: Hive X 302 and Hive Y 304. Each hive can comprise at least one of: one or more scenarios, one or more snapshots, and one or more views. In FIG. 3, Hive X 302 includes two scenarios 306 (X.S.1) and 308 (X.S.2), and two snapshots 310 (X.SS.1) and 312 (X.SS.2). Hive Y 304 includes two scenarios 314 (Y.S.1) and 316 (Y.S.2), one view 318 (Y.V.1) and one snapshot 320 (Y.SS.1).

Each scenario references a snapshot (see FIG. 12 for an example of a snapshot), which defines the data content of the scenario at a current time. The same snapshot may be referenced by multiple scenarios and views in the same hive, if they have identical content. For example, in Hive X 302, Scenario 306 references Snapshot 310, while Scenario 308 references Snapshot 312. In Hive Y 304, both Scenario 314 and Scenario 316 reference Snapshot 320, while View 318 also references Snapshot 320.

After it is fully constructed, a snapshot is immutable. Each snapshot references a number of column instances (see FIG. 11 for an example of a column instance). A column instance contains the data for a table column. The same column instance may be used to hold the data for multiple table columns, if the multiple table columns have identical content. A column instance can be referenced by one or multiple snapshots, in multiple hives. In the embodiment shown in FIG. 3, Column Instance C1 324 is referenced by Snapshot 310 (in Hive X 302); Column Instance C2 326 is referenced by Snapshot 310 and Snapshot 312 (both in Hive X 302); Column Instance C3 328 is referenced by Snapshot 310 and Snapshot 312 (both in Hive X 302); Column Instance C4 330 is referenced by Snapshot 312 (in Hive X) and Snapshot 320 (in Hive Y 304); Column Instance C5 332 is referenced by Snapshot 320 (in Hive Y 304); and Column Instance C6 334 is referenced by Snapshot 320 (in Hive Y 304). After it is fully constructed, a column instance is immutable.

A view also references a snapshot. A view can be used by a query or an algorithm execution to pin a frozen state of the scenario. After it is fully constructed, a view is immutable. In the embodiment shown in FIG. 3, View 318 in Hive Y 304 references Snapshot 320.

Scenarios differ from views in that the snapshot referenced by a scenario may change, while the snapshot referenced by a view does not change. In the embodiment shown in FIG. 3, Snapshot 320 does not change, since it is referenced by View 318 (in Hive Y 304). However, Snapshot 310 and Snapshot 312 (both in Hive X 302) can change, since neither is referenced by a view.

Figure 4:
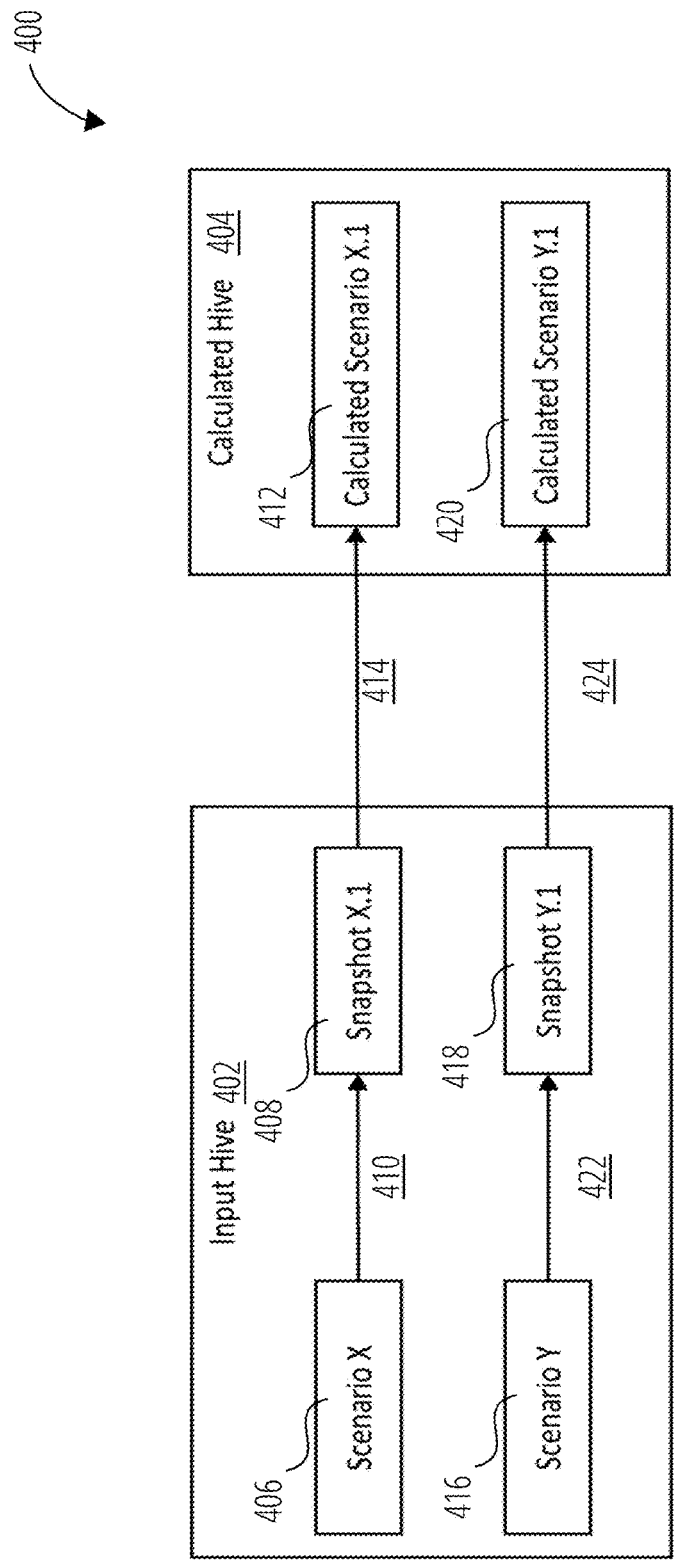
FIG. 4 illustrates calculated data in accordance with one embodiment.

FIG. 4 illustrates calculated data 400 in accordance with one embodiment. In particular, FIG. 4 shows how calculated data is related to input data.

Calculated data is updated independently from the input data it is derived from. As such, calculated columns can be split into a separate hive from the input columns. A link may be added between each input hive snapshot and the calculated hive scenario where its derived calculated data resides.

In the embodiment shown in FIG. 4, input Hive 402 (comprising input columns) is split from a separate calculated Hive 404 (comprising calculated columns). Scenario X 406 references Snapshot X.1 408 via link 410. The link 410 may be via the Scenario Definition's Current Snapshot ID. A link 414 is added between Snapshot X.1 408 and calculated Scenario X.1 412. The link 414 may be via the Snapshot's Calculated Scenario ID.

Similarly, Scenario Y 416 references Snapshot Y.1 418 via link 422. The link 422 may be via the Scenario Definition's Current Snapshot ID. A link 424 is added between Snapshot Y.1 418 and calculated Scenario Y.1 420. The link 424 may be via the Snapshot's Calculated Scenario ID.

Figure 5:
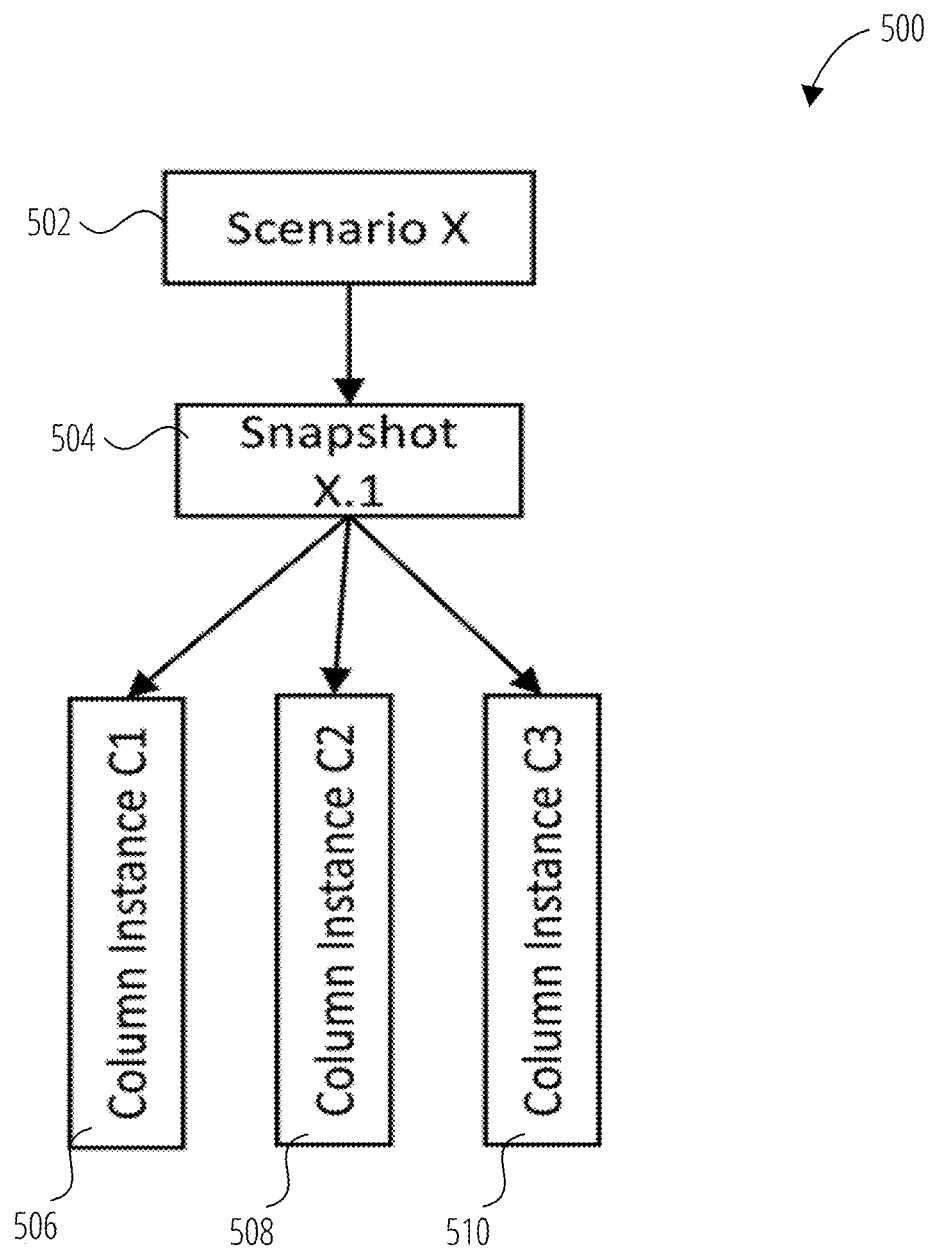
FIG. 5 illustrates a data change (before) in accordance with one embodiment.
Figure 6:
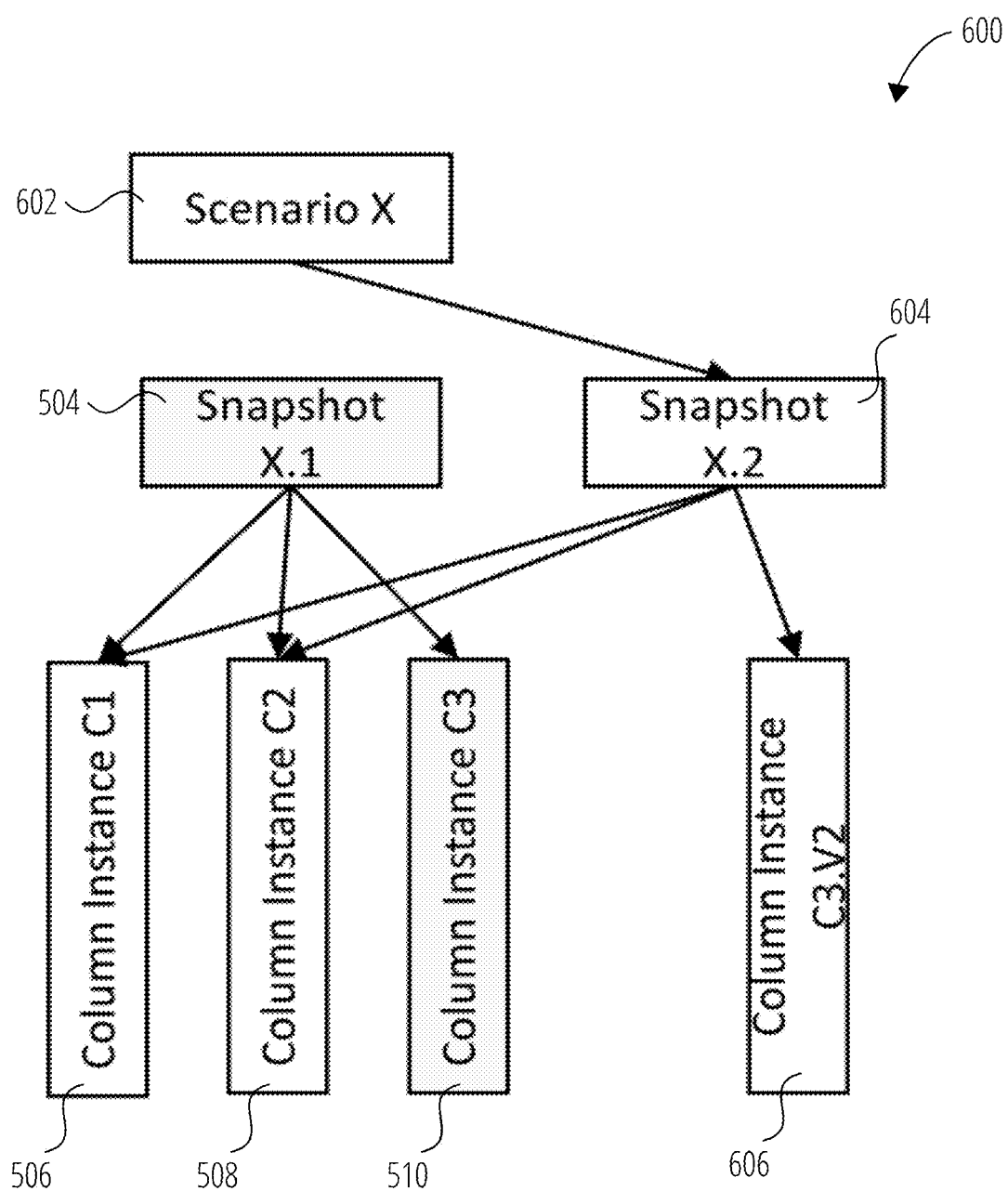
FIG. 6 illustrates a data change (after) in accordance with one embodiment.

FIG. 5 and FIG. 6 show how data changes can be represented, and how garbage can be created. FIG. 5 illustrates an initial state 500 of Scenario X in accordance with one embodiment. In FIG. 5, Scenario X 502 references Snapshot X.1 504, which references each of Column Instance C1 506, Column Instance C2 508 and Column Instance C3 510.

FIG. 6 illustrates a data change (after) 600 in accordance with one embodiment. FIG. 6 shows the state of Scenario X 602 after the content of column C3 has been updated. A new column instance C3.V2 (606) is created, to hold the new content.

A new Snapshot X.2 604 is created, to reference Column Instance C3. V2 606, instead of Column Instance C3 510. Snapshot X.2 604 continues to reference Column Instance C1 506 and Column Instance C2 508. Scenario X 602 is updated to reference Snapshot X.2 604 instead of Snapshot X.1 504. Assuming there are no other scenarios or views in the system, Snapshot X.1 504 and Column Instance C3 510 are now unreachable, and are considered garbage. It is safe to delete them from the system.

Figure 22:
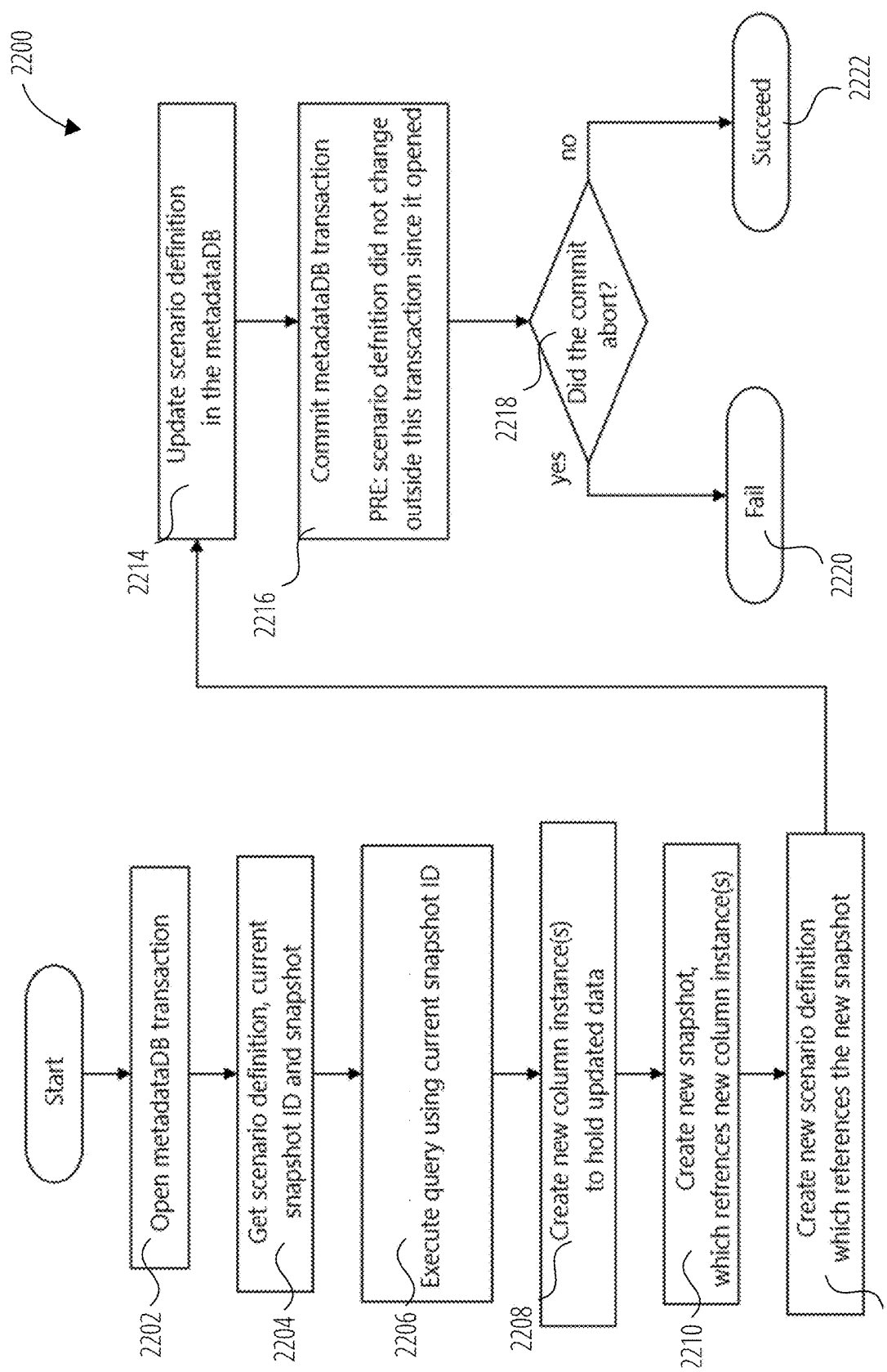
FIG. 22 illustrates a block diagram for executing a write query in a scenario, in accordance with one embodiment.

The steps in this process are illustrated in FIG. 22

Figure 7:
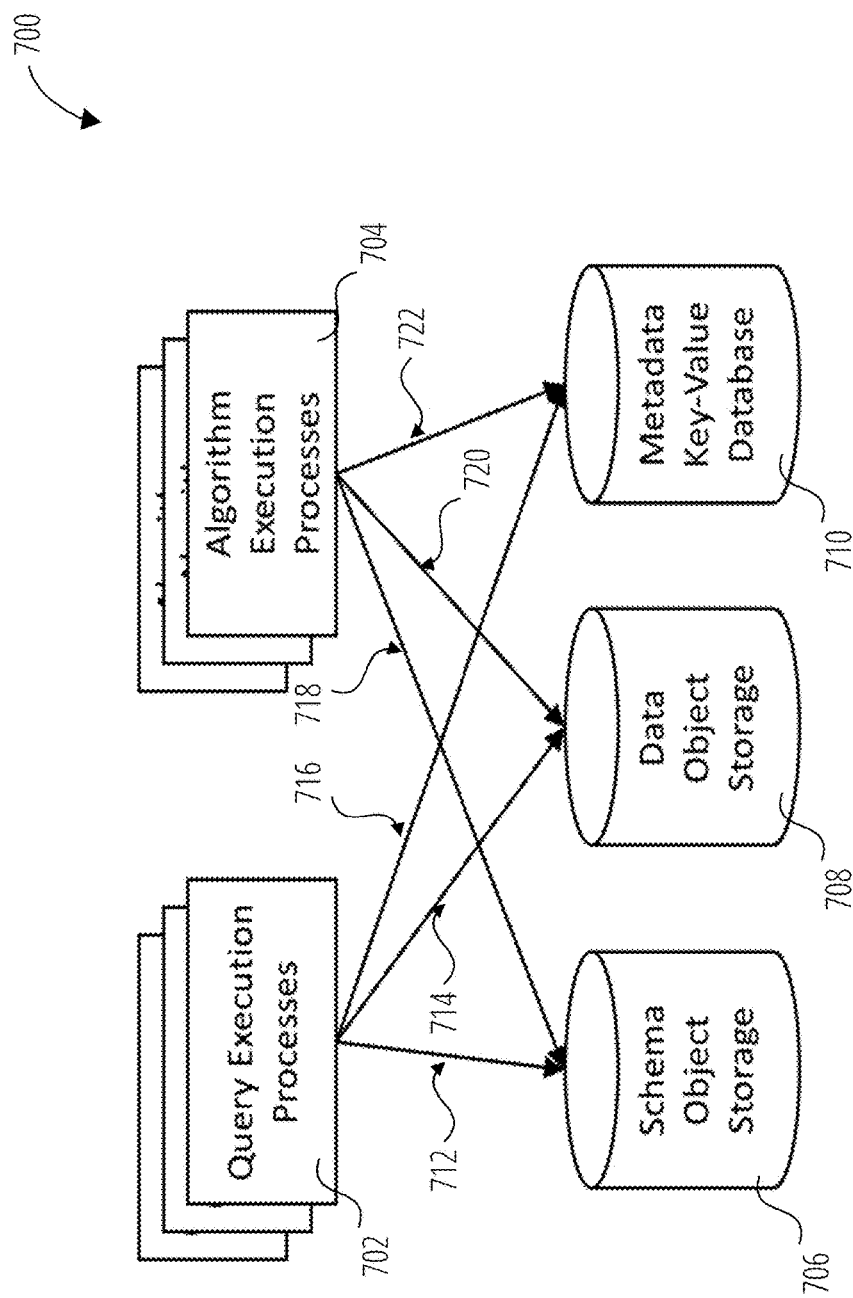
FIG. 7 illustrates a system overview in accordance with one embodiment.

FIG. 7 illustrates a system overview 700 in accordance with one embodiment. In FIG. 7, multiple query execution processes 702 and multiple algorithm execution processes 704 can access storage (706 and 708) and database (710) components in parallel. Query execution processes 702 can access: schema object storage 706 via access 712, data object storage 708 via access 714, and metadata key-value database 710 via access 716. Algorithm execution processes 704 can access: schema object storage 706 via access 718, data object storage 708 via access 720, and metadata key-value database 710 via access 722. These accesses (712-722) may be via a proxy process, and not directly from the execution process.

Query execution processes 702 can execute read and write queries, and scenario operations. Algorithm execution processes 704 can execute code that computes Calculated data (as defined above).

"Object Storage" is a storage service that can support storing blobs of data, each of which can be accessed using a unique identifier. Non-Limiting examples of storage devices include Google™ Cloud Storage and NFS (Network File System) filesystem. In the embodiment shown in FIG. 7, there is a schema object storage 706 and a data object storage 708.

"Key-Value Database" is a service that supports ACID transactions (that is, transactions that are atomic, consistent, isolated and durable) on sets of Key-Values. A non-limiting example includes etcd, which is a distributed, reliable key-value store for data of a distributed system. In the embodiment shown in FIG. 7, there is a metadata key-value database 710.

The three storages schema object storage 706, data object storage 708 and metadata key-value database 710, can be on the same or different physical devices.

FIG. 8-FIG. 15 illustrate examples of various content of the storage and database components. In these figures, schemas, snapshots, and column instances are types of data blobs. Scenario definitions and views are types of values stored in the metadata key-value database. An "ID" is a unique identifier for accessing the associated data blob. Different object storage implementations can use different ID types. Examples include: key values, a filesystem path, a URI (a Uniform Resource Identifier), and so on.

Figure 8:
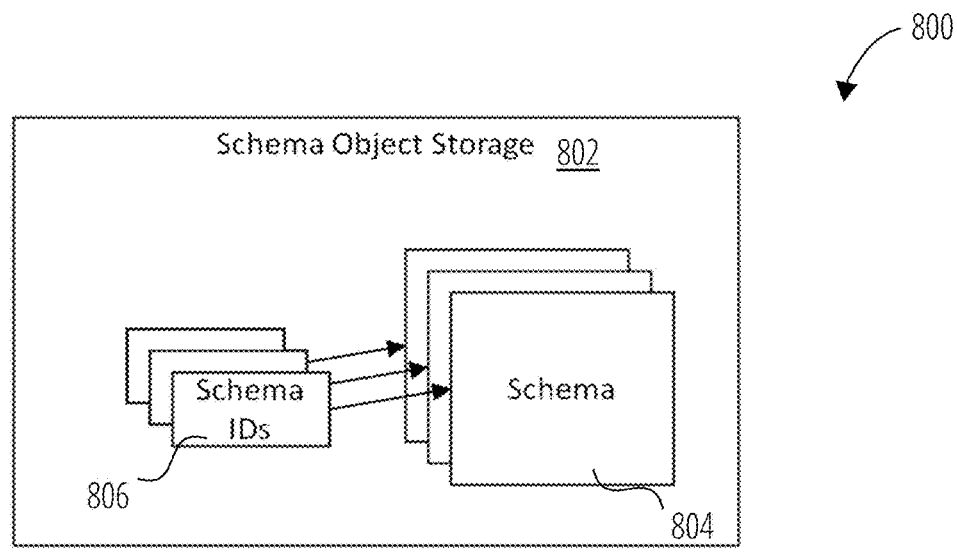
FIG. 8 illustrates schema object storage content in accordance with one embodiment.

FIG. 8 illustrates schema object storage content 800 in accordance with one embodiment. Schema object storage 802 comprises one or more schemas 804 and their respective schema ID 806.

Figure 9:
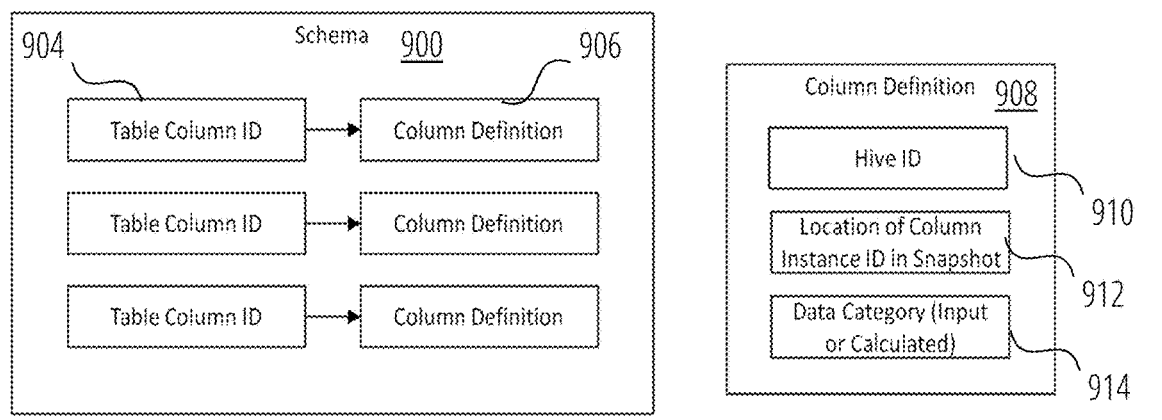
FIG. 9 illustrates a schema in accordance with one embodiment.

FIG. 9 illustrates a schema 900 in accordance with one embodiment. Schema 900 can comprise a Table Column ID 904 associated with a respective Column Definition 906. In the embodiment shown in FIG. 9, a plurality of Table Column IDs are shown with their respective Column Definitions. A Column Definition 908 can comprise a Hive ID 910, a Location of Column Instance ID in Snapshot (912) and a Data Category 914 (which may be "Input" or "Calculated", as defined above).

Figure 10:
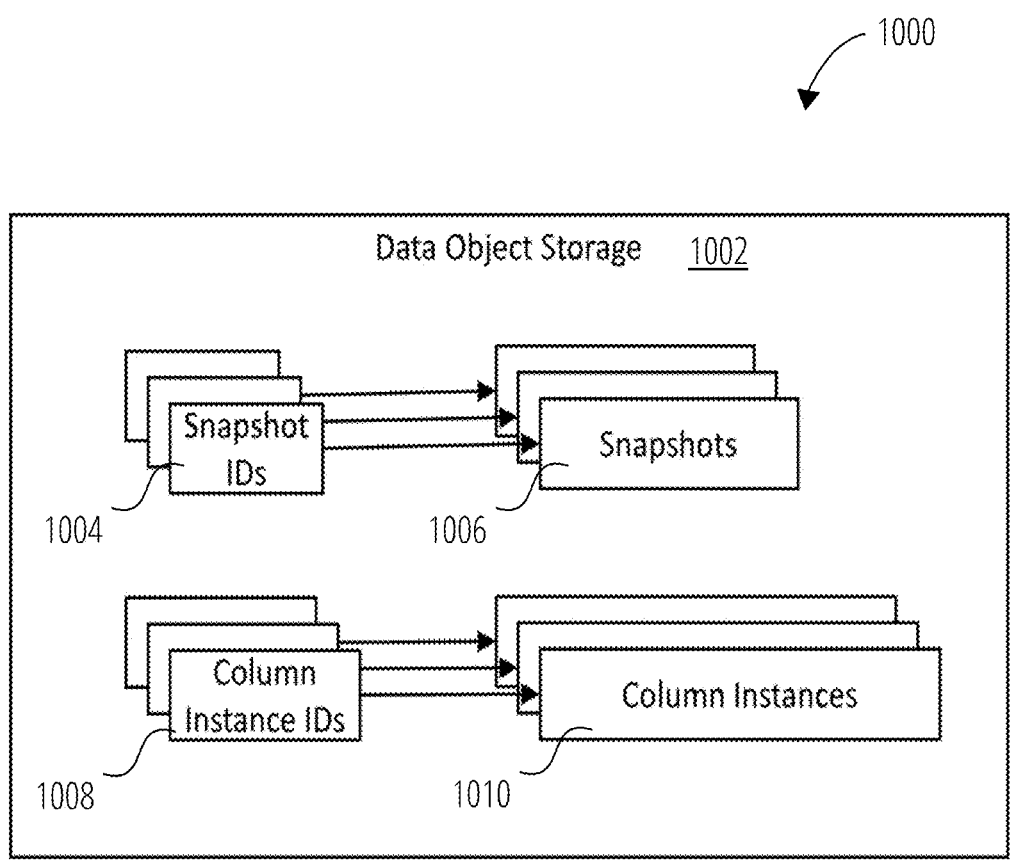
FIG. 10 illustrates data object storage content in accordance with one embodiment.

FIG. 10 illustrates data object storage content 1000 in accordance with one embodiment. Data Object Storage 1002 comprises one or more Snapshots 1006 and the respective Snapshot ID 1004; as wells one or more Column Instances 1010 and the respective 1008.

Figure 11:
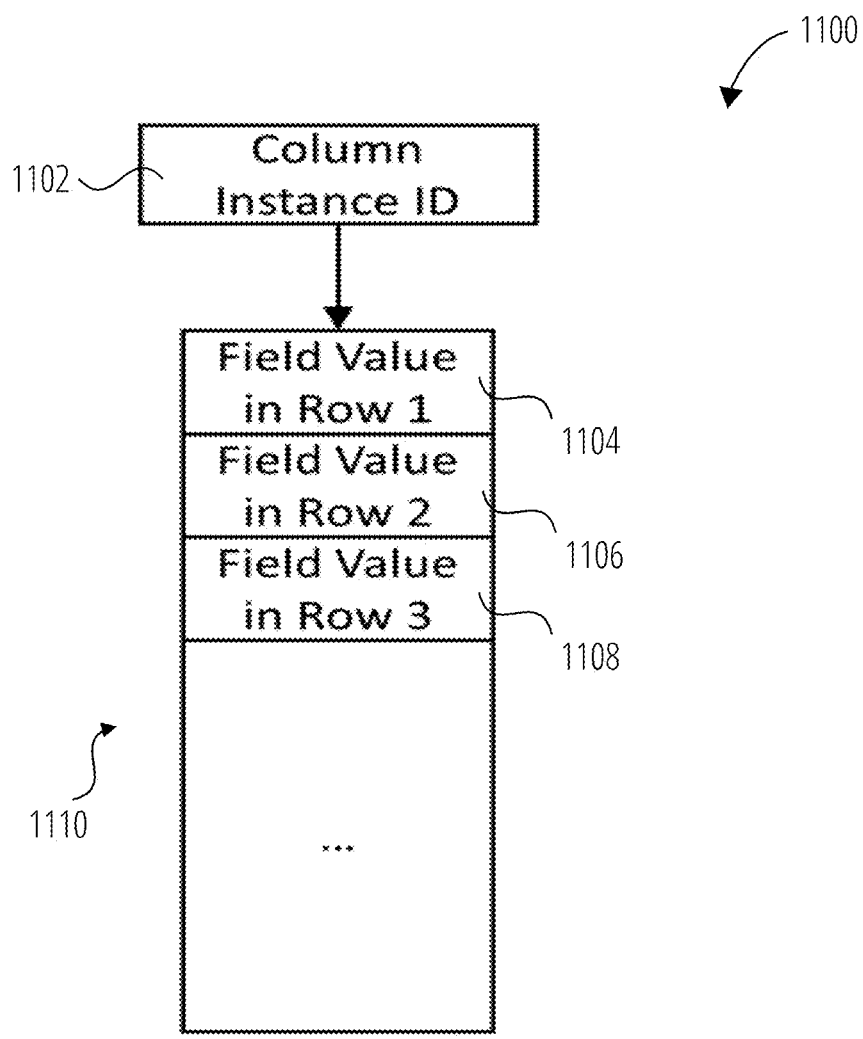
FIG. 11 illustrates a column instance in accordance with one embodiment.

FIG. 11 illustrates a column instance 1100 in accordance with one embodiment. A column instance contains the data for a table column. The same column instance may be used to hold the data for multiple table columns, if the multiple table columns have identical content. A column instance can be referenced by one or multiple snapshots, in multiple hives (see, for example, FIG. 3).

Column Instance 1110 has a corresponding Column Instance ID 1102, and comprises a series of field values in each row of the column; for example, Field Value in Row 1 1104, Field Value in Row 2 1106, Field Value in Row 3 1108, and so forth.

Figure 12:
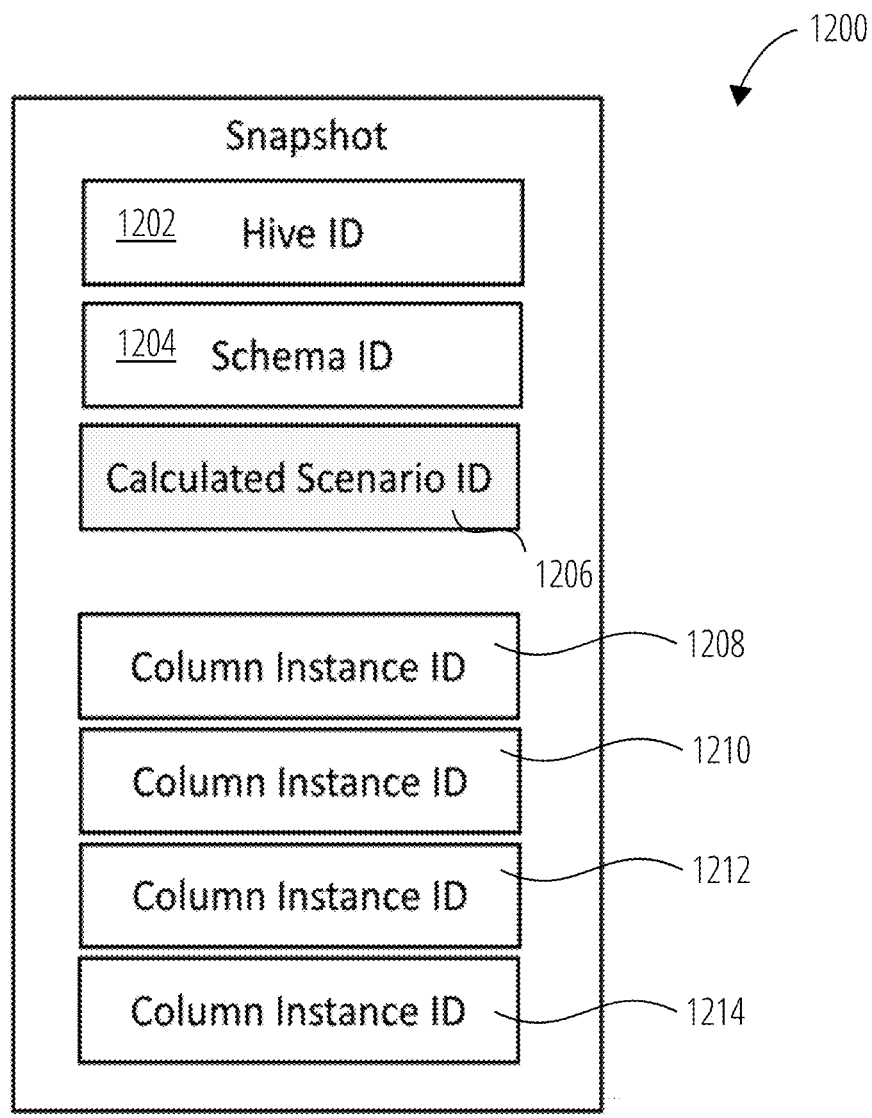
FIG. 12 illustrates a snapshot in accordance with one embodiment.

FIG. 12 illustrates a snapshot 1200 in accordance with one embodiment. A snapshot defines the data content of a scenario at a current time. The same snapshot may be referenced by multiple scenarios and views in the same hive, if they have identical content (see, for example, FIG. 3).

Snapshot 1200 may comprise: a Hive ID 1202. A Schema ID 1204. A Calculated Scenario ID 1206, and one or more Column Instance IDs (1208, 1210, 1212 and 1214). With reference to Schema ID 1204, multiple snapshots may reference the same schema. In addition, Calculated Scenario ID 1206 is used only if the snapshot's hive is associated with a calculated hive. A Column Instance ID may be contained in more than one snapshot. It may also be contained in snapshots in a different hive. Furthermore, some of the Column Instance IDs in a snapshot may be equal to each other.

Figure 13:
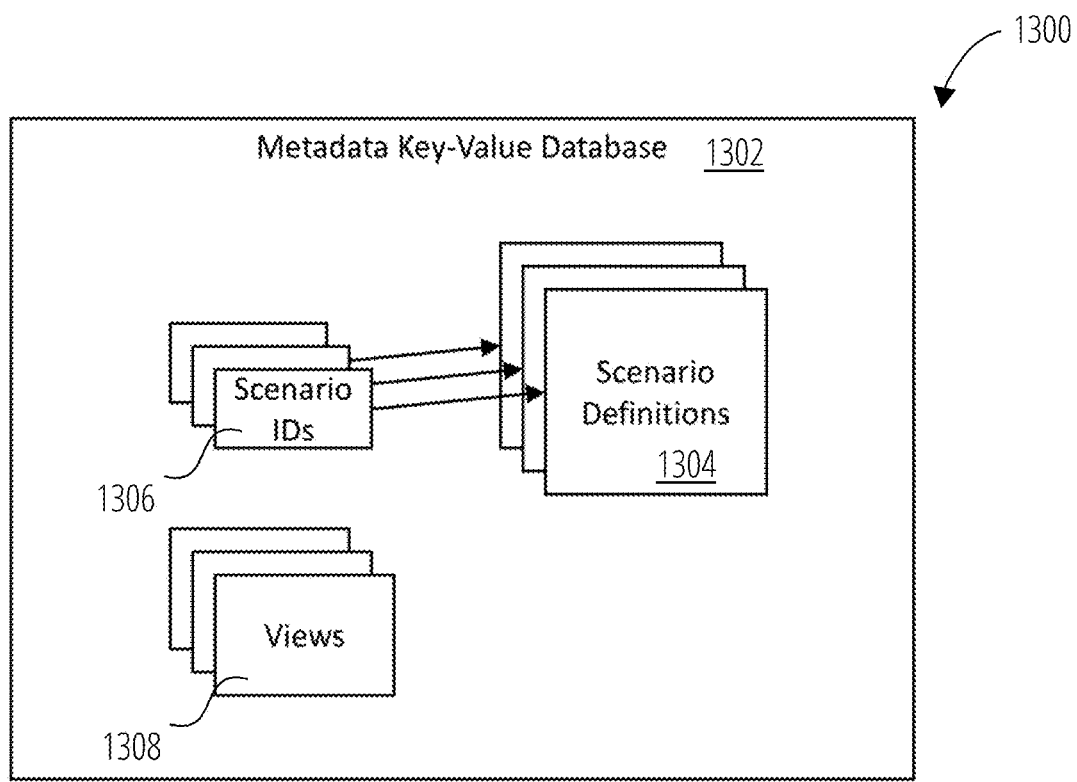
FIG. 13 illustrates metadata key-value database (metadataDB) content in accordance with one embodiment.
Figure 14:
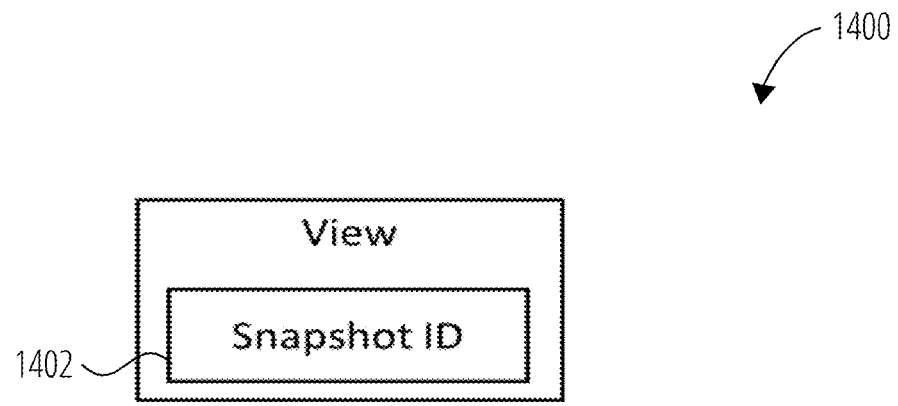
FIG. 14 illustrates a view in accordance with one embodiment.

FIG. 13 illustrates metadata key-value database (metadataDB) content 1300 in accordance with one embodiment. Metadata Key-Value Database 1302 comprises: one or more views 1308; and one or more Scenario Definitions 1304 and their respective Scenario ID 1306. An example of a view is illustrated in FIG. 14. An example of a Scenario Definition is illustrated in FIG. 15.

FIG. 14 illustrates a view 1400 in accordance with one embodiment. View 1400 comprises a Snapshot ID 1402. A view can reference a snapshot. A view can be used by a query or an algorithm execution to pin a frozen state of the scenario. After it is fully constructed, a view is immutable.

Figure 15:
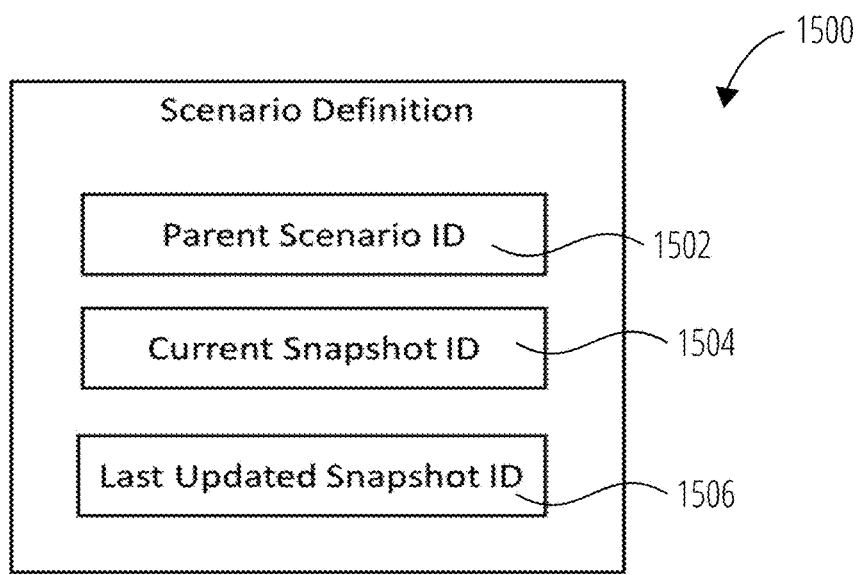
FIG. 15 illustrates a scenario definition in accordance with one embodiment.

FIG. 15 illustrates a scenario definition 1500 in accordance with one embodiment. Scenario definition 1500 comprises: a Parent Scenario ID 1502, a Current Snapshot ID 1504, and a Last Updated Snapshot ID 1506.

Parent Scenario ID 1502 is an ID of the scenario's parent, as defined by the corresponding scenario tree (see, for example, FIG. 2). For a root scenario, the parent scenario ID is nil. Current Snapshot ID 1504 is an ID of the snapshot (see, for example, FIG. 8) that defines the data that is currently visible in this scenario. Last Updated Snapshot ID 1506 is the ID of the snapshot of its parent scenario when the last ScenarioUpdate operation was run on this scenario. Recall from the definition of ScenarioUpdate above, ScenarioUpdate (scenario) is an operation that pulls and merges data changes of the scenario's parent into the scenario. For a root scenario, the last updated snapshot ID is nil.

Figure 16:
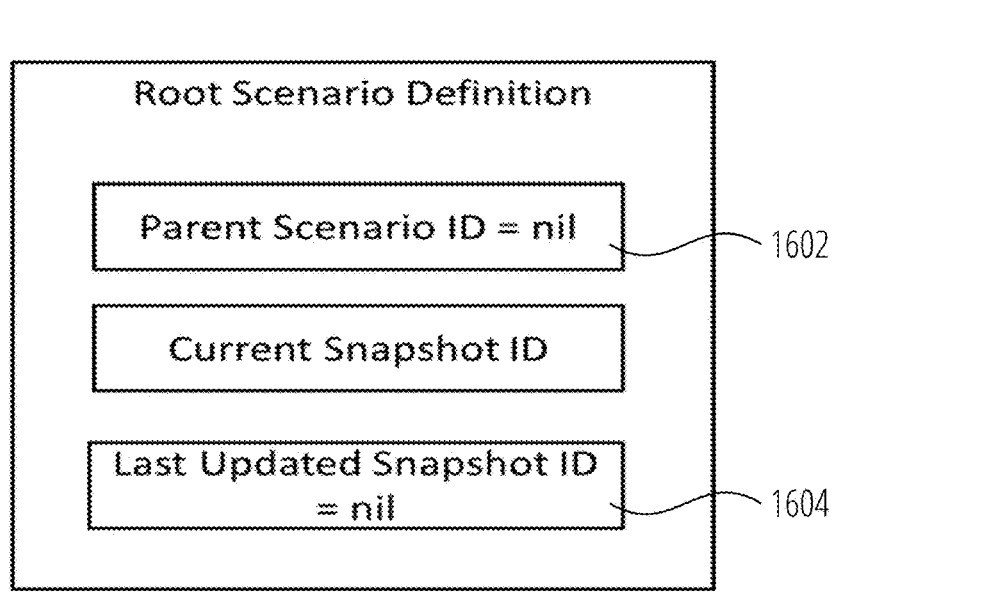
FIG. 16 illustrates a root scenario definition in accordance with one embodiment.

FIG. 16 illustrates a root scenario definition 1600 in accordance with one embodiment. In FIG. 16, shown is an example of a scenario definition for a root scenario, which shows the nil members. Namely, Parent Scenario ID 1602 and Last Updated Snapshot ID 1604. This is consistent with the definition of Parent Scenario ID and Last Updated Snapshot ID, provided above.

Figure 17:
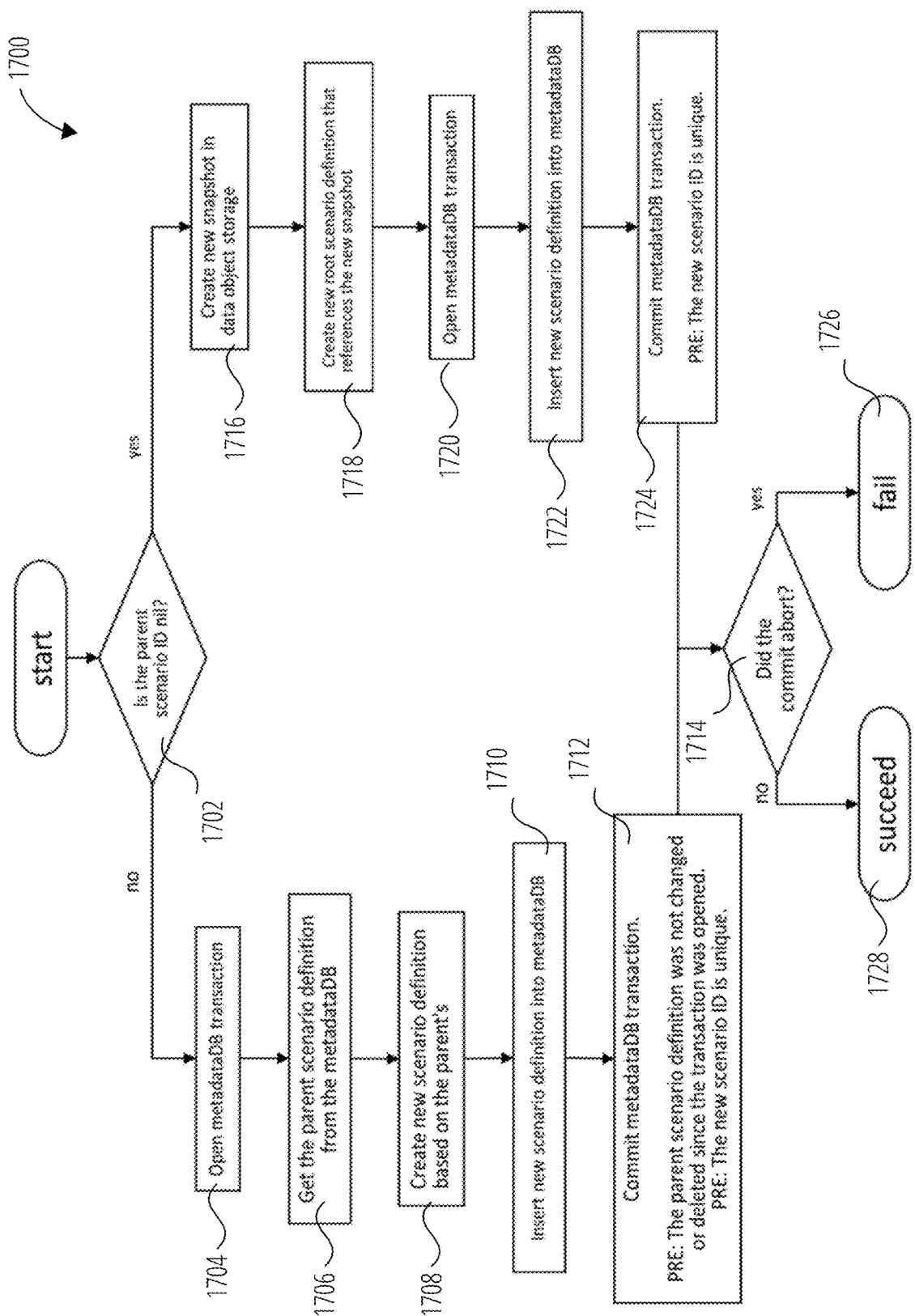
FIG. 17 illustrates a block diagram for creation of a scenario in accordance with one embodiment.

FIG. 17 illustrates a block diagram 1700 for creation of a scenario, given its ID, hive and parent scenario ID, in accordance with one embodiment.

The process begins at decision block 1702, to check if the parent scenario ID is 'nil'. A nil parent scenario ID means that the new scenario is a root scenario.

If the parent scenario is not a root scenario (that is, 'no' at decision block 1702), then a metadataDB transaction is opened at block 1704. The term "metadataDB" is an abbreviation of "metadata key-value database" (defined above). A metadataDB transaction refers to an operation that is supported by the metadataDB. It is scoped to the content of the metadataDB. It is not limited to a hive. Furthermore, a metadataDB transaction is first opened and then either committed or aborted. Updates to the metadataDB that are made in the scope of a transaction are not actually applied to the metadataDB until the transaction is committed (see block 1712).

At block 1706, the parent scenario definition is obtained from the metadataDB.

Next, at block 1708, a new scenario definition is created based on the parent's scenario definition. As an example, a new scenario definition for the child has:
  scenario ID=the parent scenario's ID;
  current snapshot ID=the parent's current snapshot ID; and
  last updated snapshot ID=the parent's current snapshot ID.

Next, at block 1710, the new scenario definition into the metadataDB. Subsequently, at block 1712, the metadataDB transaction is committed, with the following preconditions: the parent scenario definition was not changed or deleted since the transaction was opened; and the new scenario ID is unique. As part of the commit, the preconditions are validated by the metadataDB. If the preconditions are not met, then the commit aborts ('yes' at decision block 1714), which means the commit fails (1726). If the preconditions are met, then the commit does not abort ('no' at decision block 1714), which means the commit succeeds (1728).

If the parent scenario is a root scenario (that is, 'yes' at decision block 1702), then a new snapshot is created in a data object storage at block 1716. As an example, a new scenario definition for the new root scenario has:
  Hive ID=the hive specified when the scenario creation was requested;
  Schema ID=the current schema ID for the database;
  Calculated scenario ID=if needed, an automatically-generated unique scenario ID; and
  All column instance IDs=nil, which means they contain no data.

Next, at block 1718, a new root scenario definition is created that references the new snapshot. See, for example, FIG. 16, for an example of a root scenario definition. A metadataDB transaction can opened at block 1720, followed by insertion of the new scenario definition into the metadataDB at block 1722. At block 1724, metadataDB transaction is committed, with the precondition that the new scenario ID is unique. If the precondition is not met, then the commit aborts ('yes' at decision block 1714), which means the commit fails (1726). If the precondition is met, then the commit does not abort ('no' at decision block 1714), which means the commit succeeds (1728).

The term "PRE" is an abbreviation of "precondition", in FIG. 17-FIG. 24.

Figure 18:
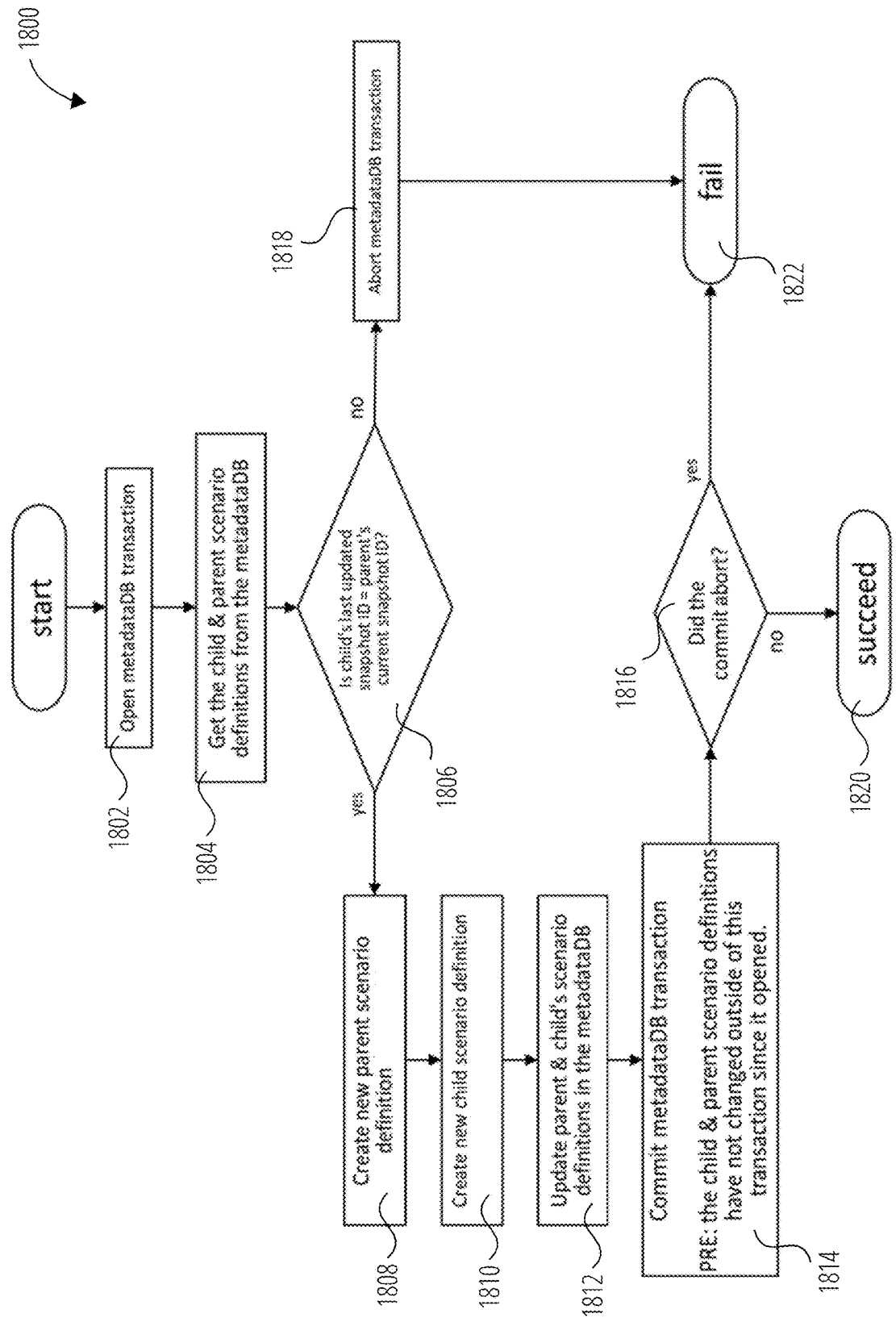
FIG. 18 illustrates a block diagram for a ScenarioCommit of a child scenario in accordance with one embodiment.

FIG. 18 illustrates a block diagram 1800 for a ScenarioCommit of a child scenario in accordance with one embodiment. This operation cannot be invoked on a root scenario.

A metadataDB transaction is opened at block 1802. Child and parent scenario definitions are obtained from the metadataDB at block 1804. Then, at decision block 1806, there is a check to see if the child's last updated snapshot ID is equal to the parent's current snapshot ID. This condition ensures that all data changes in the parent scenario have already been merged into the child scenario. ScenarioCommit does not merge data. If the child's last updated snapshot ID is not equal to the parent's current snapshot ID ('no' at decision block 1806), then the metadataDB transaction aborts at block 1818, and the ScenarioCommit of a child scenario fails (1822).

On the other hand, if the child's last updated snapshot ID is equal to the parent's current snapshot ID ('yes' at decision block 1806), then a new parent scenario definition is created at block 1808. The parent's new scenario definition has a current snapshot ID equal to the child's current snapshot ID. Other members remain unchanged from a previous definition.

At block 1810, a new child scenario definition is created. The child's new scenario definition has a last updated snapshot ID equal to the child's current snapshot ID. Other members remain unchanged from a previous definition.

Next, at block 1812, parent and child's scenario definitions are updated in the metadataDB. At block 1814, the metadataDB transaction is committed, with the precondition that the child and parent scenario definitions have not changed outside of this transaction since it opened. If the precondition is not met, then the commit aborts ('yes' at decision block 1816), which means the ScenarioCommit of a child scenario fails (1822). If the precondition is met, then the commit does not abort ('no' at decision block 1816), which means the ScenarioCommit of a child scenario succeeds (1820).

Figure 19:
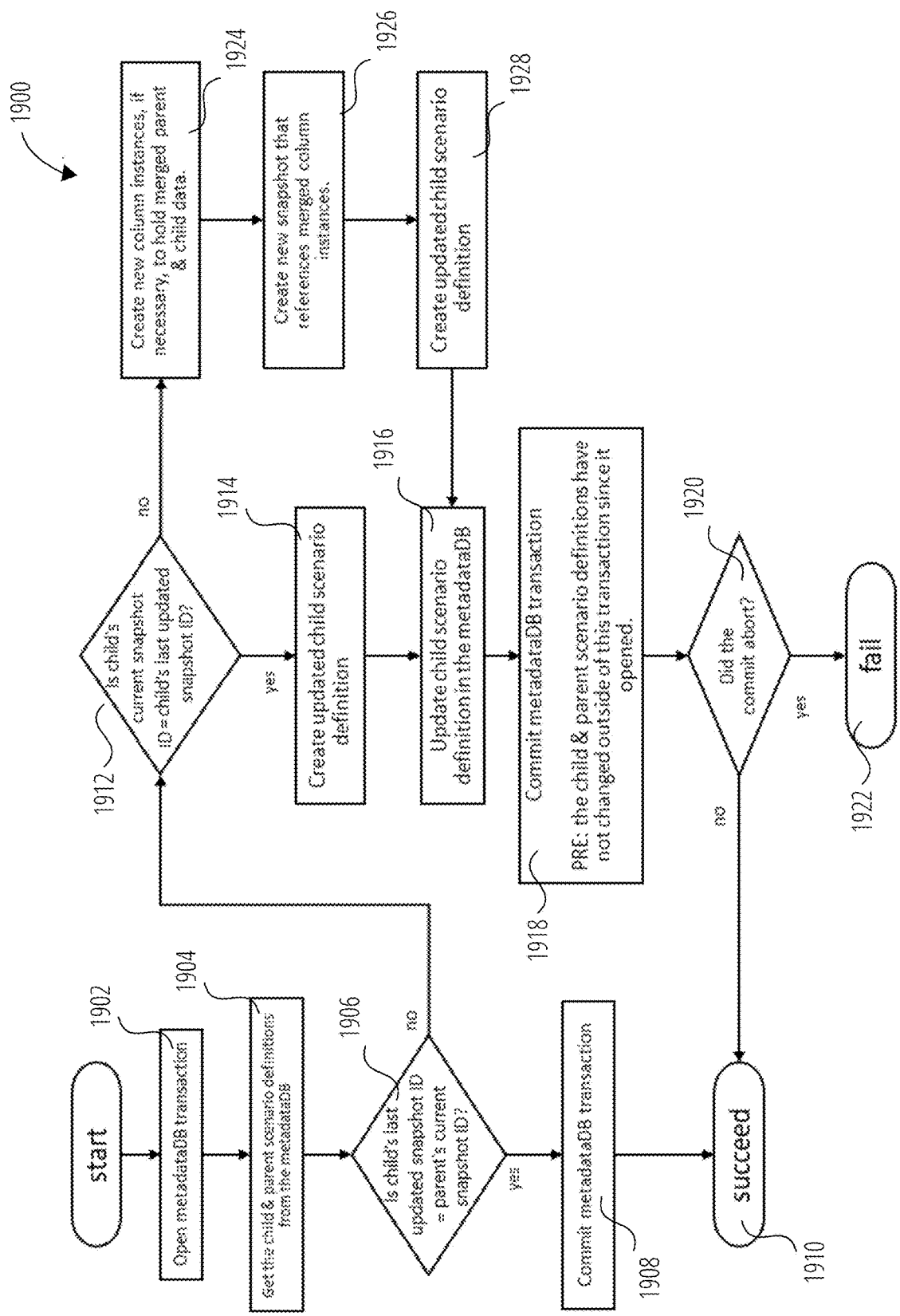
FIG. 19 illustrates a block diagram for a ScenarioUpdate of a child scenario in accordance with one embodiment.

FIG. 19 illustrates a block diagram 1900 for a ScenarioUpdate of a child scenario in accordance with one embodiment. This operation cannot be invoked on a root scenario.

A metadataDB transaction is opened at block 1902. Next, at block 1904, child and parent scenario definitions are obtained from the metadataDB. At decision block 1906, there is a check to see if the child's last updated snapshot ID is equal to the parent's current snapshot ID. If true ('yes' at decision block 1906), this condition indicates there are no unmerged data changes from the parent scenario. There is a commit of the metadataDB transaction at block 1908, without any precondition, and operation succeeds (1910).

On the other hand, if the child's last updated snapshot ID is not equal to the parent's current snapshot ID ('no' at decision block 1906), then there is a check to see if the child's current snapshot ID is equal to the child's last updated snapshot ID at decision block 1912.

If true ('yes' at decision block 1912), this condition indicates that there are no data changes in the child scenario that have not been previously merged to the parent. An updated child scenario definition is then created at block 1914. The new child scenario definition has:
  Current snapshot ID=Parent's current snapshot ID; and
  Last updated snapshot ID=Parent's current snapshot ID.
  Other members remain unchanged. The operation proceeds to block 1916, where the child scenario definition is updated in the metadataDB.

The operation proceeds to block 1918, where the metadataDB transaction is committed, with the precondition that the child and parent scenario definitions have not changed outside of this transaction since it opened. If the precondition is not met, then the commit aborts ('yes' at decision block 1920), which means the ScenarioUpdate of a child scenario fails (1922). If the precondition is met, then the commit does not abort ('no' at decision block 1920), which means the ScenarioUpdate of a child scenario succeeds (1910).

If, on the other hand, the child's current snapshot ID is not equal to the child's last updated snapshot ID at decision block 1912 (that is, 'no'), then new column instances are created, if necessary, to hold merged parent and child data at block 1924. A new snapshot is created that references merged column instances at block 1926, followed by creation of an updated child scenario definition at block 1928. The new child scenario definition has:

Current snapshot ID=New snapshot ID; and

Last updated snapshot ID=Parent's current snapshot ID.

The operation proceeds to block 1916, where the child scenario definition is updated in the metadataDB. Next, at block 1918, where the metadataDB transaction is committed, with the precondition that the child and parent scenario definitions have not changed outside of this transaction since it opened. If the precondition is not met, then the commit aborts ('yes' at decision block 1920), which means the ScenarioUpdate of a child scenario fails (1922). If the precondition is met, then the commit does not abort ('no' at decision block 1920), which means the ScenarioUpdate of a child scenario succeeds (1910).

Figure 20:
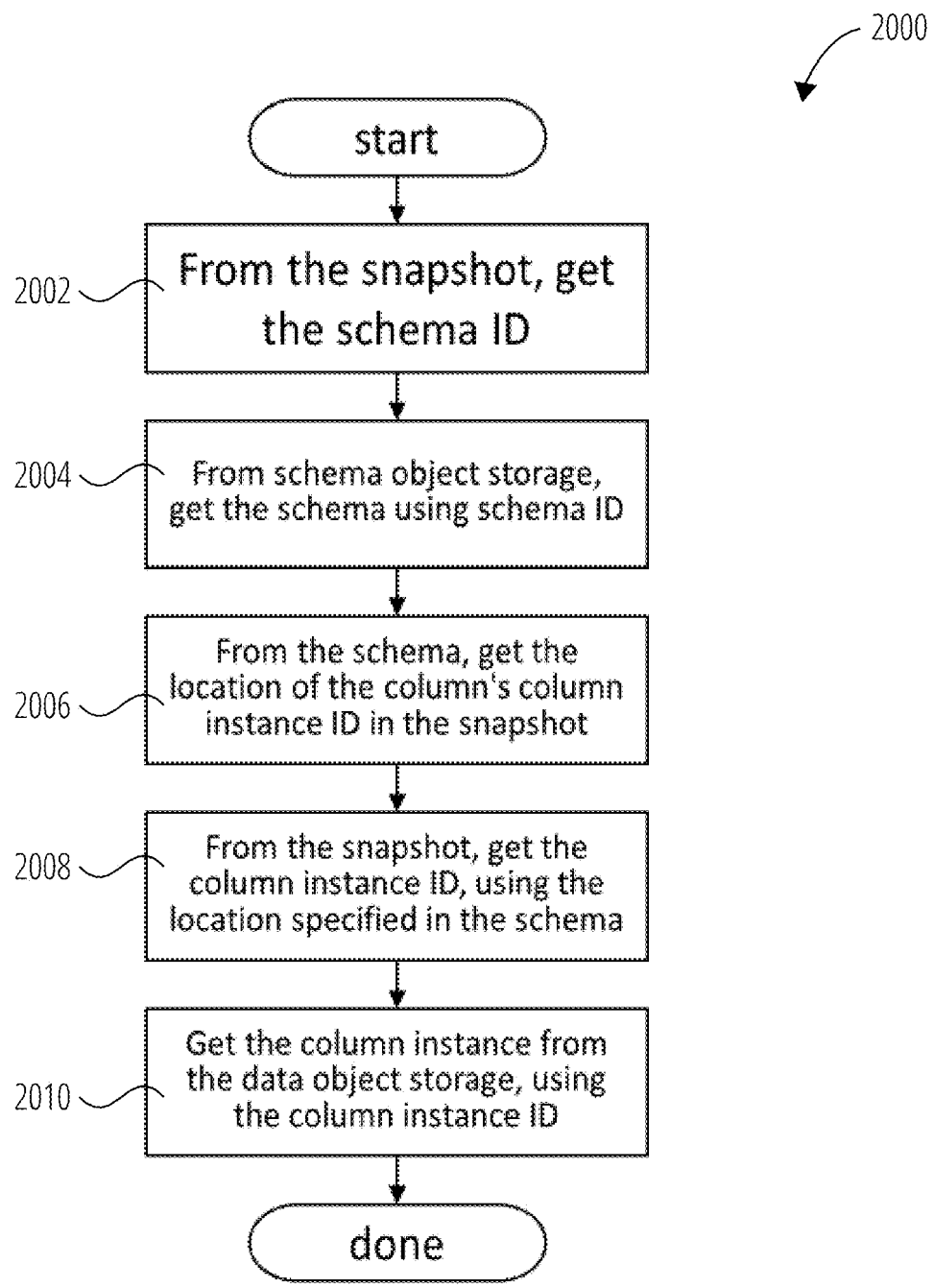
FIG. 20 illustrates a block diagram for obtaining data for a table column in a given snapshot, in accordance with one embodiment.

FIG. 20 illustrates a block diagram 2000 for obtaining data for a table column in a given snapshot, in accordance with one embodiment.

At block 2002, the schema ID is obtained from the snapshot. The schema (that is using the schema ID obtained in block 2002), is obtained from schema object storage at block 2004. Next, at block 2006, from the schema, the location of the column's column instance ID in the snapshot is obtained. Furthermore, at block 2008, from the snapshot, the column instance ID, using the location specified in the schema, is obtained. Finally, at block 2010, the column instance is obtained from the data object storage, using the column instance ID.

Figure 21:
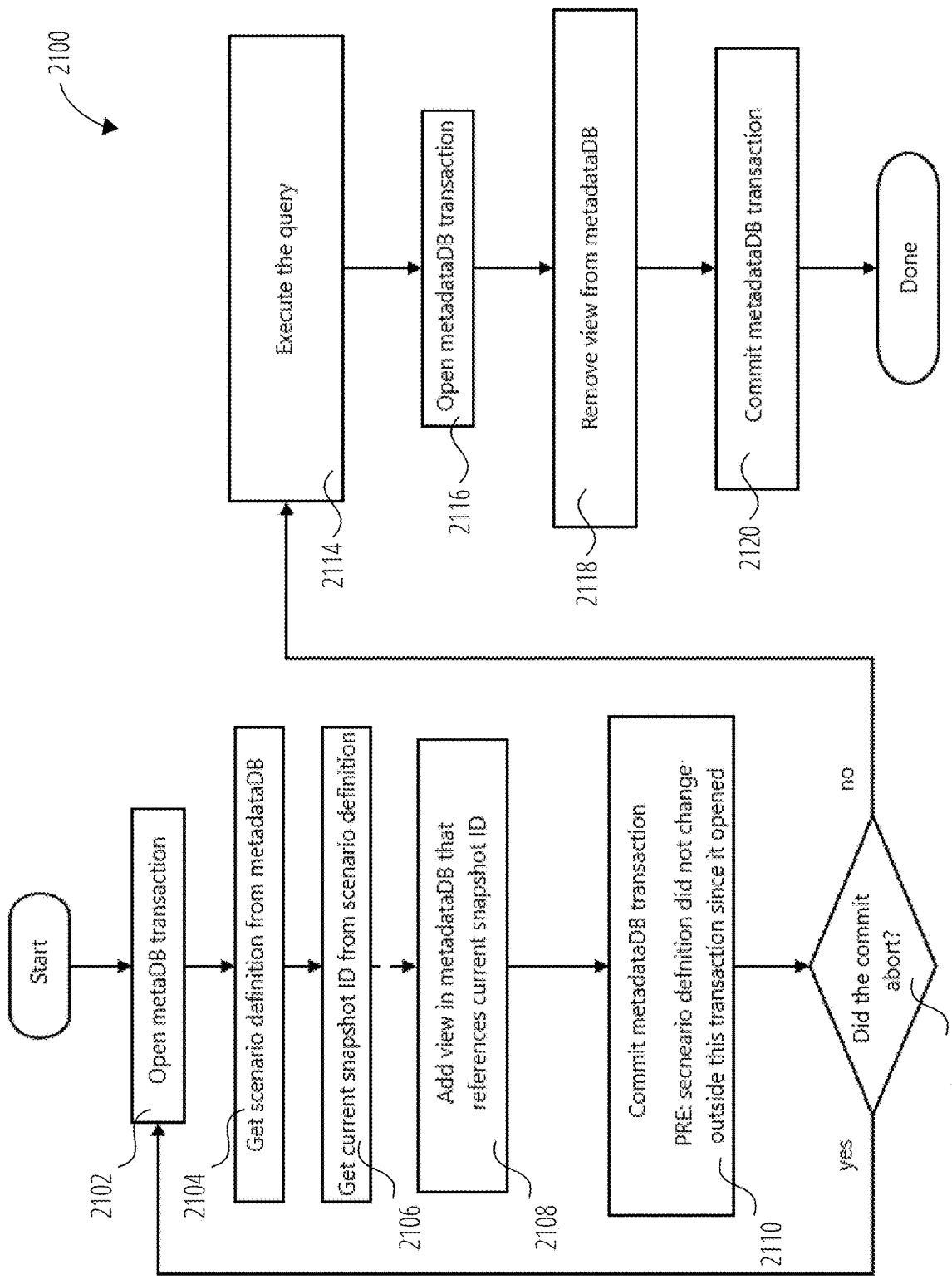
FIG. 21 illustrates a block diagram for execution of a read query in a scenario, in accordance with one embodiment.

FIG. 21 illustrates a block diagram 2100 for execution of a read query in a scenario, in accordance with one embodiment.

A metadataDB transaction is opened at block 2102. The scenario definition of the scenario can be obtained from the metadataDB at block 2102. A current snapshot ID can be obtained from the scenario definition at block 2104. Next, at block 2106, a view may be added in the metadataDB, that references the current snapshot ID. At block 2108, a metadataDB transaction can be committed, with a precondition that the scenario definition did not change outside this transaction since it opened. If the precondition is not met, then the commit aborts ('yes' at decision block 2112), and the operation returns to block 2102 to open a new metadataDB transaction.

If the precondition is met, then the commit does not abort ('no' at decision block 2112), and the operation proceeds to block 2114 where the query can be executed. The query can access the snapshot data, using for example, the block diagram illustrated in FIG. 20. The metadataDB transaction may be opened at block 2116. The view may then be removed from the metadataDB at block 2118, followed by committing the metadataDB transaction at block 2120.

FIG. 22 illustrates a block diagram 2200 for executing a write query in a scenario, in accordance with one embodiment.

A metadataDB transaction is opened at block 2202. Next, at block 2204, the scenario definition, current snapshot ID, and snapshot can be obtained. At block 2206, the query can be executed using the current snapshot ID. The query can compute updated data for the scenario. Column instance(s) can be created to hold the updated data at block 2208. A new snapshot, which references the new column instance(s), can be created at block 2210. Next, at block 2212, a new scenario definition, which references the new snapshot, can be created. At block 2214, the scenario definition may be updated in the metadataDB. At block 2216, the metadataDB transaction can be committed, with a precondition that the scenario definition did not change outside this transaction since it opened. If the precondition is not met, then the commit aborts ('yes' at decision block 2218), and the operation fails (2220). If the precondition is met, then the commit does not abort ('no' at decision block 2218), and the operation succeeds (2222).

Figure 23:
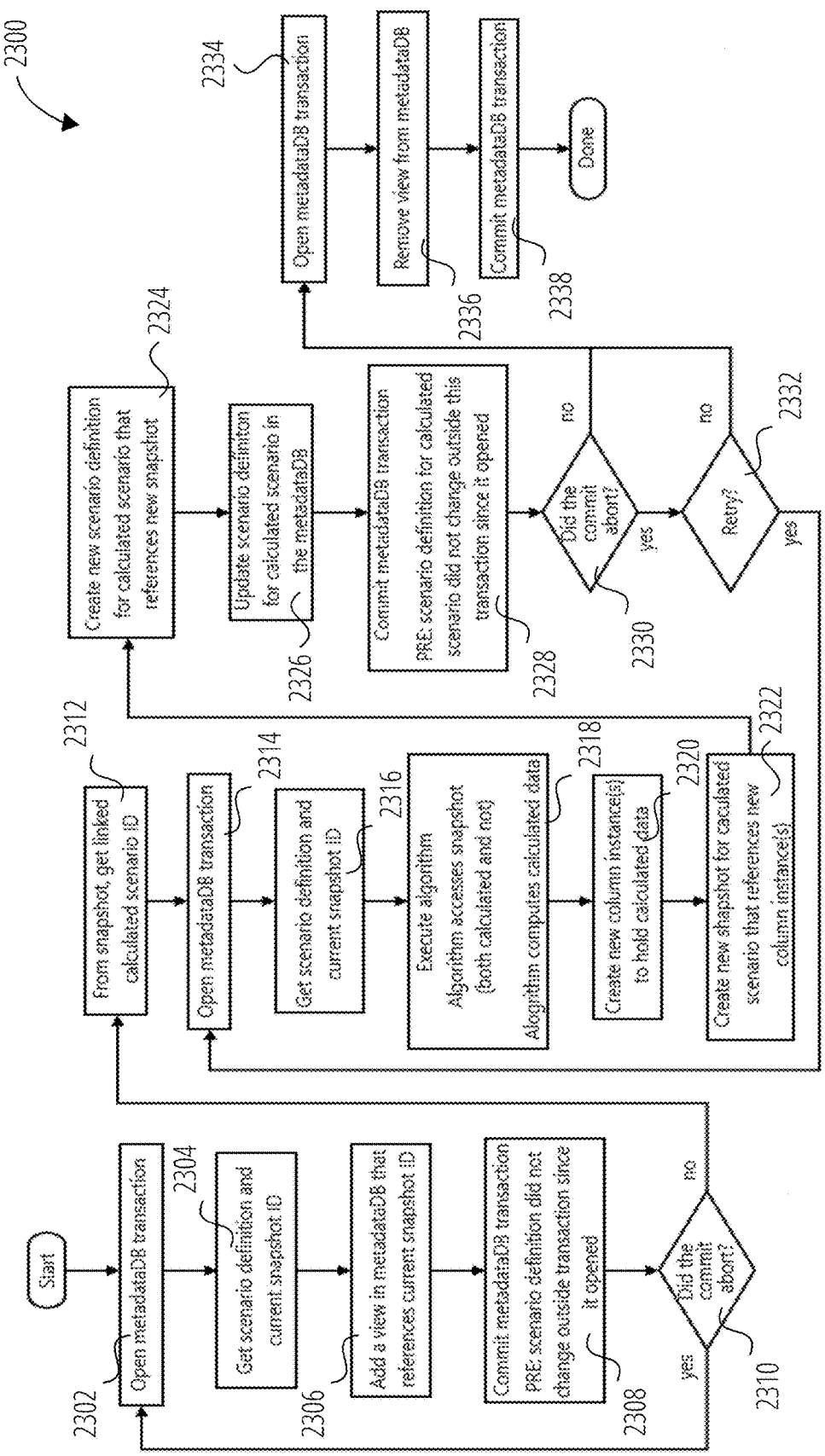
FIG. 23 illustrates a block diagram for executing an algorithm and storing its calculated data in a scenario, in accordance with one embodiment.

FIG. 23 illustrates a block diagram 2300 for executing an algorithm and storing its calculated data in a scenario, in accordance with one embodiment.

A metadataDB transaction is opened at block 2302. The scenario's scenario definition and current snapshot ID are obtained at block 2304. Next at block 2306, a view is added in the metadataDB, which references the current snapshot ID.

At block 2308, a metadataDB transaction can be committed, with a precondition that the scenario definition did not change outside this transaction since it opened. If the precondition is not met, then the commit aborts ('yes' at decision block 2310), and the operation returns to block 2302 to open a new metadataDB transaction.

If the precondition is met, then the commit does not abort ('no' at decision block 2310), and the operation proceeds to block 2312 where the linked calculated scenario ID can be obtained from the snapshot. At block 2314, a metadataDB transaction is opened. Next, at block 2316, the calculated scenario's scenario definition and current snapshot ID are obtained. At block 2318, the algorithm is executed. The algorithm accesses the snapshot (both calculated and not) data using a process such as that illustrated in FIG. 20. The algorithm computes the calculated data.

At block 2320, one or more new column instances can be created to hold the calculated data, followed by block 2322 where a new snapshot for the calculated scenario can be calculated. The new snapshot references the one or more new column instances. At block 2324, a new scenario definition can be created for the calculated scenario. The new scenario definition can reference the new snapshot. At block 2326, the scenario definition for the calculated scenario can be updated in the metadataDB.

At this point, there is an opportunity to commit the metadataDB transaction at block 2328, with a precondition that the scenario definition did not change outside this transaction since it opened. If the precondition is not met, then the commit aborts ('yes' at decision block 2330), and the operation can retry at decision block 2332. The step of retrying is optional, depending on the desired behaviour of the system.

If the precondition is met, then the commit does not abort ('no' at decision block 2332), and the operation proceeds to block 2334. The metadataDB transaction is opened at block 2334, after which the view is removed from the metadataDB at block 2336. At block 2338, the metadataDB transaction is committed.

Figure 24:
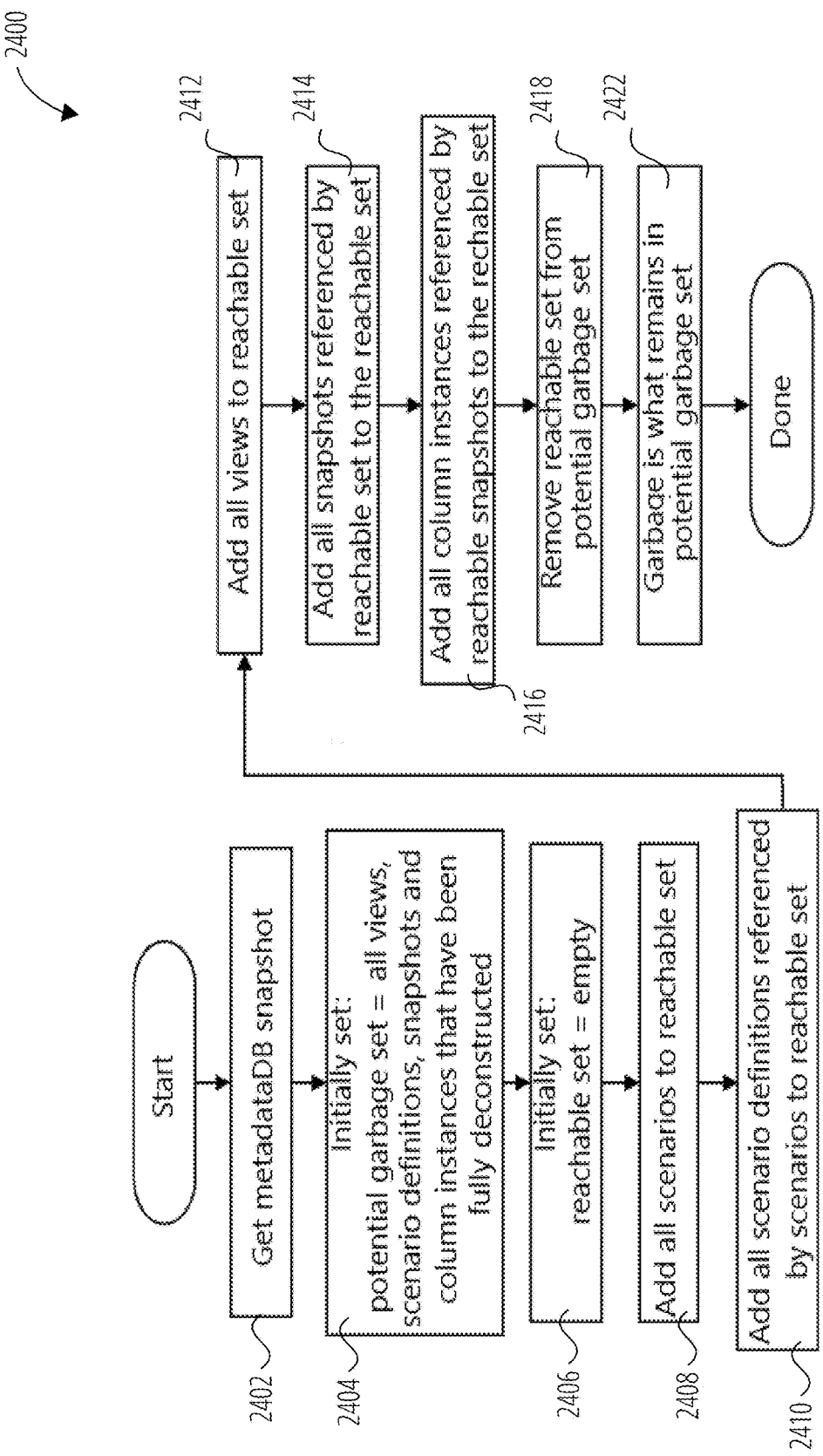
FIG. 24 illustrates a block diagram for identifying unreachable data, in accordance with one embodiment.

FIG. 24 illustrates a block diagram 2400 for identifying unreachable data, in accordance with one embodiment.

The process begins by obtaining a metadataDB snapshot at block 2402. In FIG. 24, "snapshot" is different from the snapshot of FIG. 12. Obtaining a metadataDB snapshot is an operation that is supported by the metadataDB.

At block 2404, initially, a potential garbage set encompasses all views, scenario definitions, snapshots, and column instances that have been fully constructed. Furthermore, at block 2406, a reachable set is initially set to 'empty". All scenarios are added to the reachable set block 2408. Furthermore, all scenario definitions referenced by scenarios are added to the reachable set, at block 2410. All views are added to the reachable set at block 2412. Next, all snapshots referenced by the reachable set are added to the reachable set at block 2414. All column instances referenced by reachable snapshots are added to the reachable set at block 2416. The reachable set is removed from the potential garbage set at block 2418. Finally, the garbage is what remains in the potential garbage set, at block 2422. Garbage data can be safely deleted from the system.

Figure 25:
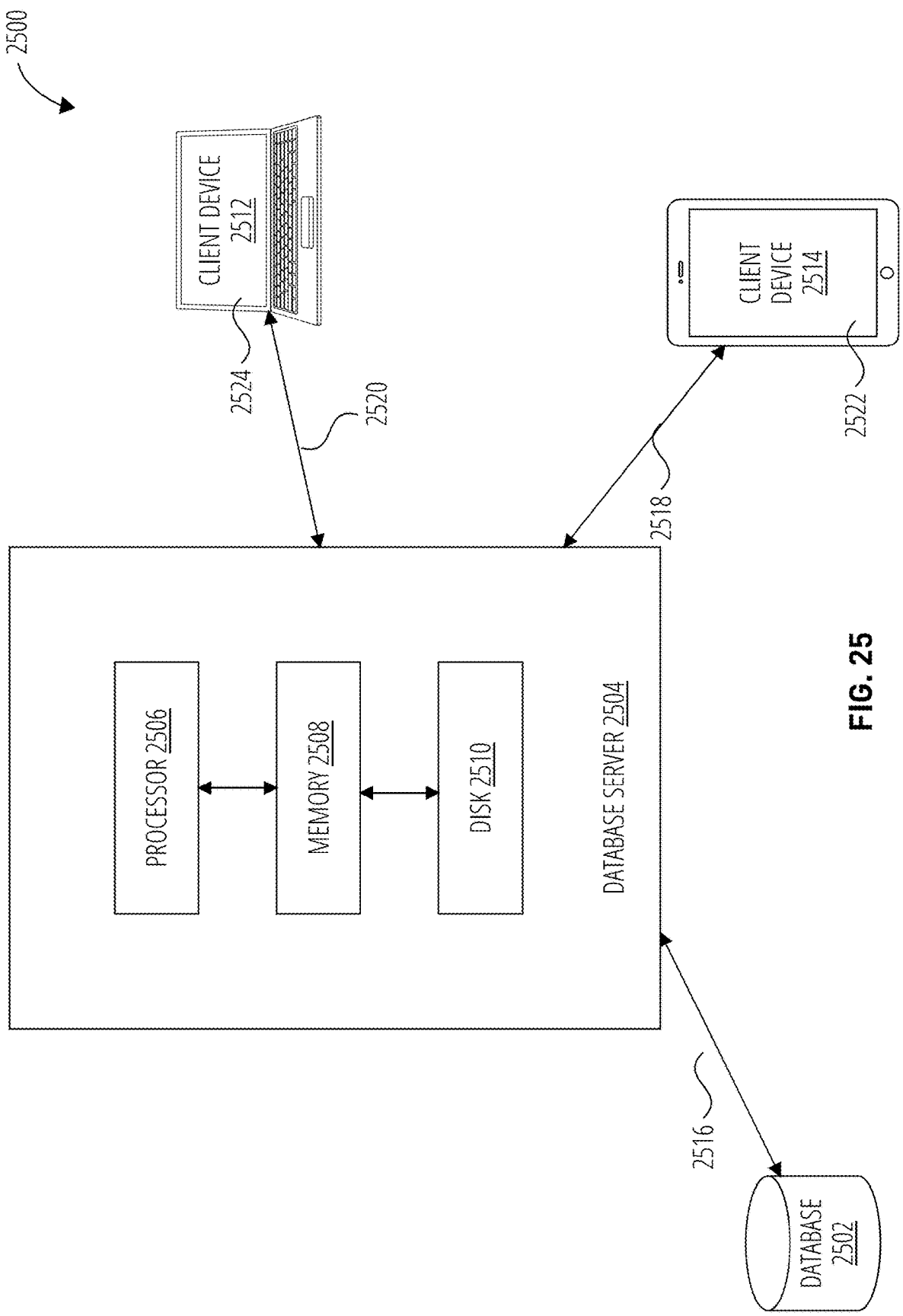
FIG. 25 illustrates an example of a system for a scalable versioned database in accordance with one embodiment.

FIG. 25 illustrates an example of a system 2500 for a scalable versioned database System 2500 includes a database server 2504, a database 2502, and client devices 2512 and 2514. Database server 2504 can include a memory 2508, a disk 2510, and one or more processors 2506. In some embodiments, memory 2508 can be volatile memory, compared with disk 2510 which can be non-volatile memory. In some embodiments, database server 2504 can communicate with database 2502 using interface 2516. Database 2502 can be a versioned database or a database that does not support versioning. While database 2502 is illustrated as separate from database server 2504, database 2502 can also be integrated into database server 2504, either as a separate component within database server 2504, or as part of at least one of memory 2508 and disk 2510. A versioned database can refer to a database which provides numerous complete delta-based copies of an entire database. Each complete database copy represents a version. Versioned databases can be used for numerous purposes, including simulation and collaborative decision-making.

System 2500 can also include additional features and/or functionality. For example, system 2500 can also include additional storage (removable and/or non-removable) including, but not limited to, magnetic or optical disks or tape. Such additional storage is illustrated in FIG. 25 by memory 2508 and disk 2510. Storage media can include volatile and nonvolatile, removable and non-removable media implemented in any method or technology for storage of information such as computer-readable instructions, data structures, program modules or other data. Memory 2508 and disk 2510 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 2500. Any such non-transitory computer-readable storage media can be part of system 2500.

System 2500 can also include interfaces 2516, 2518 and 2520. Interfaces 2516, 2518 and 2520 can allow components of system 2500 to communicate with each other and with other devices. For example, database server 2504 can communicate with database 2502 using interface 2516. Database server 2504 can also communicate with client devices 2512 and 2514 via interfaces 2520 and 2518, respectively. Client devices 2512 and 2514 can be different types of client devices; for example, client device 2512 can be a desktop or laptop, whereas client device 2514 can be a mobile device such as a smartphone or tablet with a smaller display. Non-limiting example interfaces 2516, 2518 and 2520 can include wired communication links such as a wired network or direct-wired connection, and wireless communication links such as cellular, radio frequency (RF), infrared and/or other wireless communication links. Interfaces 2516, 2518 and 2520 can allow database server 2504 to communicate with client devices 2512 and 2514 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 2516, 2518 and 2520 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 2516, database server 2504 can retrieve data from database 2502. The retrieved data can be saved in disk 2510 or memory 2508. In some cases, database server 2504 can also comprise a web server, and can format resources into a format suitable to be displayed on a web browser. Database server 2504 can then send requested data to client devices 2512 and 2514 via interfaces 2520 and 2518, respectively, to be displayed on applications 2522 and 2524. Applications 2522 and 2524 can be a web browser or other application running on client devices 2512 and 2514.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computing apparatus comprising:
   a processor; and
   a memory storing instructions that, when executed by the processor, configure the apparatus to:
   open, by the processor, a transaction in a metadata key-value database;
   obtain, by the processor, a scenario definition of a scenario from the metadata key-value database, the scenario definition comprising a current snapshot ID and a parent or root scenario ID;
   obtain, by the processor, the current snapshot ID from the scenario definition;
   add, by the processor, a view in the metadata key-value database, the view referencing the current snapshot ID;
   commit, by the processor, the transaction in the metadata key-value database;
   execute, by the processor, a read query;
   open, by the processor, the transaction in the metadata key-value database;
   remove, by the processor, the view in the metadata key-value database; and
   commit, by the processor, the transaction in the metadata key-value database.

2. The computing apparatus of claim 1, wherein when executing the read query, the apparatus is further configured to accessing snapshot data.

3. The computing apparatus of claim 2, wherein when accessing the snapshot data, the apparatus is further configured to:
   obtain, by the processor, a schema ID from a snapshot corresponding to the current snapshot ID;
   obtain, by the processor, a schema corresponding to the schema ID from a schema storage object;
   obtain, by the processor, a location of a column instance ID in the snapshot;
   obtain, by the processor, the column instance ID using the location; and
   obtain, by the processor, a column instance from a data object storage, using the column instance ID.

4. The computing apparatus of claim 1, wherein the transaction is committed in the metadata key-value database provided the scenario definition remained unchanged outside the transaction since the transaction opened.

5. A non-transitory computer-readable storage medium, the computer-readable storage medium including instructions that when executed by a computer, cause the computer to:
   open, by a processor, a transaction in a metadata key-value database;
   obtain, by the processor, a scenario definition of a scenario from the metadata key-value database, the scenario definition comprising a current snapshot ID and a parent or root scenario ID;
   obtain, by the processor, the current snapshot ID from the scenario definition;
   add, by the processor, a view in the metadata key-value database, the view referencing the current snapshot ID;
   commit, by the processor, the transaction in the metadata key-value database;
   execute, by the processor, a read query;
   open, by the processor, the transaction in the metadata key-value database;
   remove, by the processor, the view in the metadata key-value database; and
   commit, by the processor, the transaction in the metadata key-value database.

6. The computer-readable storage medium of claim 5, wherein when executing the read query, the computer is further configured to access snapshot data.

7. The computer-readable storage medium of claim 6, wherein when accessing the snapshot data, the computer is further configured to:
   obtain, by the processor, a schema ID from a snapshot corresponding to the current snapshot ID;
   obtain, by the processor, a schema corresponding to the schema ID from a schema storage object;
   obtain, by the processor, a location of a column instance ID in the snapshot;
   obtain, by the processor, the column instance ID using the location; and
   obtain, by the processor, a column instance from a data object storage, using the column instance ID.

8. The computer-readable storage medium of claim 5, wherein the transaction is committed in the metadata key-value database provided the scenario definition remained unchanged outside the transaction since the transaction opened.

9. A computer-implemented method for executing a read query in a scenario in a scalable versioned database, the method comprising:
   opening, by a processor, a transaction in a metadata key-value database;
   obtaining, by the processor, a scenario definition of the scenario from the metadata key-value database, the scenario definition comprising a current snapshot ID and a parent or root scenario ID;
   obtaining, by the processor, the current snapshot ID from the scenario definition;
   adding, by the processor, a view in the metadata key-value database, the view referencing the current snapshot ID;
   committing, by the processor, the transaction in the metadata key-value database;
   executing, by the processor, the read query;
   opening, by the processor, the transaction in the metadata key-value database;
   removing, by the processor, the view in the metadata key-value database; and
   committing, by the processor, the transaction in the metadata key-value database.

10. The computer-implemented method of claim 9, wherein executing the read query comprises accessing snapshot data.

11. The computer-implemented method of claim 10, wherein accessing the snapshot data comprises:
   obtaining, by the processor, a schema ID from a snapshot corresponding to the current snapshot ID;
   obtaining, by the processor, a schema corresponding to the schema ID from a schema storage object;
   obtaining, by the processor, a location of a column instance ID in the snapshot;

obtaining, by the processor, the column instance ID using the location; and obtaining, by the processor, a column instance from a data object storage, using the column instance ID.

12. The computer-implemented method of claim 9, wherein the transaction is committed in the metadata key-value database provided the scenario definition remained unchanged outside the transaction since the transaction opened.

* * * * *